(12) United States Patent
Ikeda et al.

(10) Patent No.: US 7,374,200 B2
(45) Date of Patent: May 20, 2008

(54) HEAD PROTECTING AIRBAG DEVICE

(75) Inventors: Takanobu Ikeda, Aichi-ken (JP);
Tadashi Yamamoto, Aichi-ken (JP);
Yoji Hamamoto, Obu (JP); Masanori Yajima, Obu (JP)

(73) Assignees: Toyoda Gosei Co., Ltd., Aichi-ken (JP); Matsuo Industries, Inc., Aichi-ken (JP)

( * ) Notice: Subject to any disclaimer, the term of this patent is extended or adjusted under 35 U.S.C. 154(b) by 427 days.

(21) Appl. No.: 11/233,484

(22) Filed: Sep. 23, 2005

(65) Prior Publication Data
US 2006/0066080 A1    Mar. 30, 2006

(30) Foreign Application Priority Data
Sep. 27, 2004    (JP) .............................. 2004-280264

(51) Int. Cl.
*B60R 21/20* (2006.01)
(52) U.S. Cl. .............................. 280/728.2; 280/730.2; 411/45; 411/903
(58) Field of Classification Search ............. 280/728.2, 280/730.2, 749; 411/45–48, 508–510, 913, 411/901–903
See application file for complete search history.

(56) References Cited

U.S. PATENT DOCUMENTS

| | | | | |
|---|---|---|---|---|
| 4,865,505 A | * | 9/1989 | Okada | 411/512 |
| 5,775,860 A | * | 7/1998 | Meyer | 411/46 |
| 6,074,150 A | * | 6/2000 | Shinozaki et al. | 411/508 |
| 6,511,273 B2 | * | 1/2003 | Arisaka | 411/48 |
| 6,739,619 B2 | * | 5/2004 | Mueller | 280/730.2 |
| 7,120,971 B2 | * | 10/2006 | Osterland et al. | 24/295 |
| 7,188,393 B2 | * | 3/2007 | Kawai | 24/297 |
| 7,210,886 B2 | * | 5/2007 | Kawai et al. | 411/508 |
| 7,273,227 B2 | * | 9/2007 | Kawai et al. | 280/730.2 |
| 2003/0129040 A1 | * | 7/2003 | Arisaka | 411/41 |
| 2007/0003390 A1 | * | 1/2007 | Kawai | 411/48 |

FOREIGN PATENT DOCUMENTS

| | | |
|---|---|---|
| JP | A-H10-203289 | 8/1998 |
| JP | CN-1436675 A | 8/2003 |

* cited by examiner

*Primary Examiner*—Joe H. Cheng
*Assistant Examiner*—Nicole Verley
(74) *Attorney, Agent, or Firm*—Posz Law Group, PLC

(57) ABSTRACT

In a head protecting air bag device according to the present invention, a clip for attaching an attaching portion of an air bag to a fixing part on the side of a vehicle body includes a clip body and a locking part. The clip body has a shaft having a pair of securing legs protruded. The pair of securing legs are inserted in the fixing slot of the fixing part from an in-vehicle side via the attaching slot of the attaching portion and secured to the peripheral edge on an out-vehicle side of the fixing slot. The shaft is composed of a shell member of a metallic plate on the outer periphery and a core member of synthetic resin on the inner periphery. The core member is arranged on the opposite sides of a pair of securing lugs of the shell member. The core member has an inserting space in which a spacer of the locking part is inserted between the pair of securing lugs. The spacer limits the mutual approaching of the pair of securing legs. In the head protecting air bag according to this invention, using the clip, the attaching portion of the air bag can be easily attached to the vehicle body side with assured attaching stability.

6 Claims, 23 Drawing Sheets

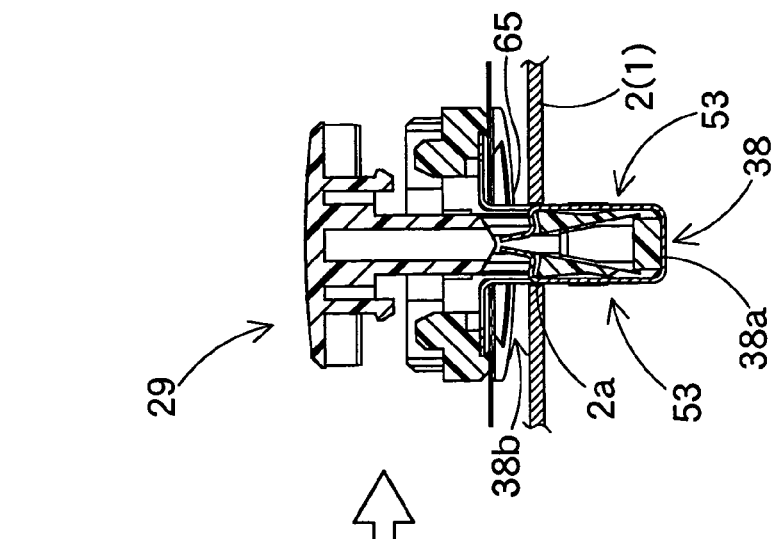
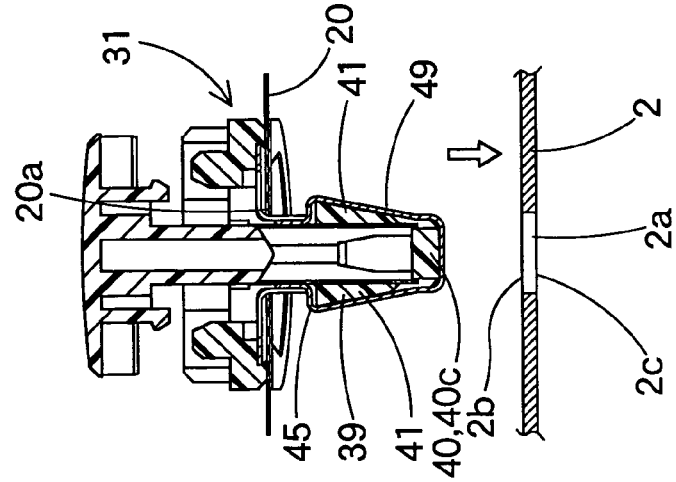
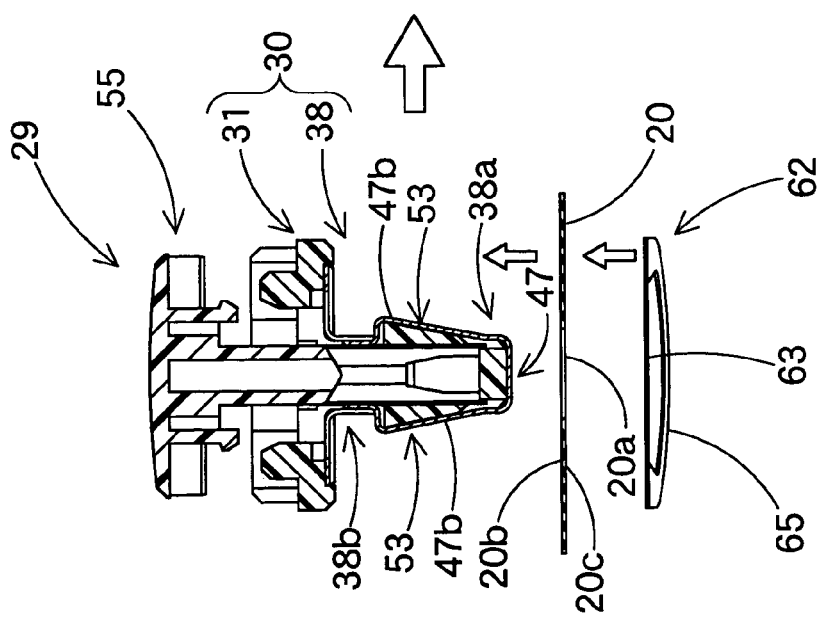

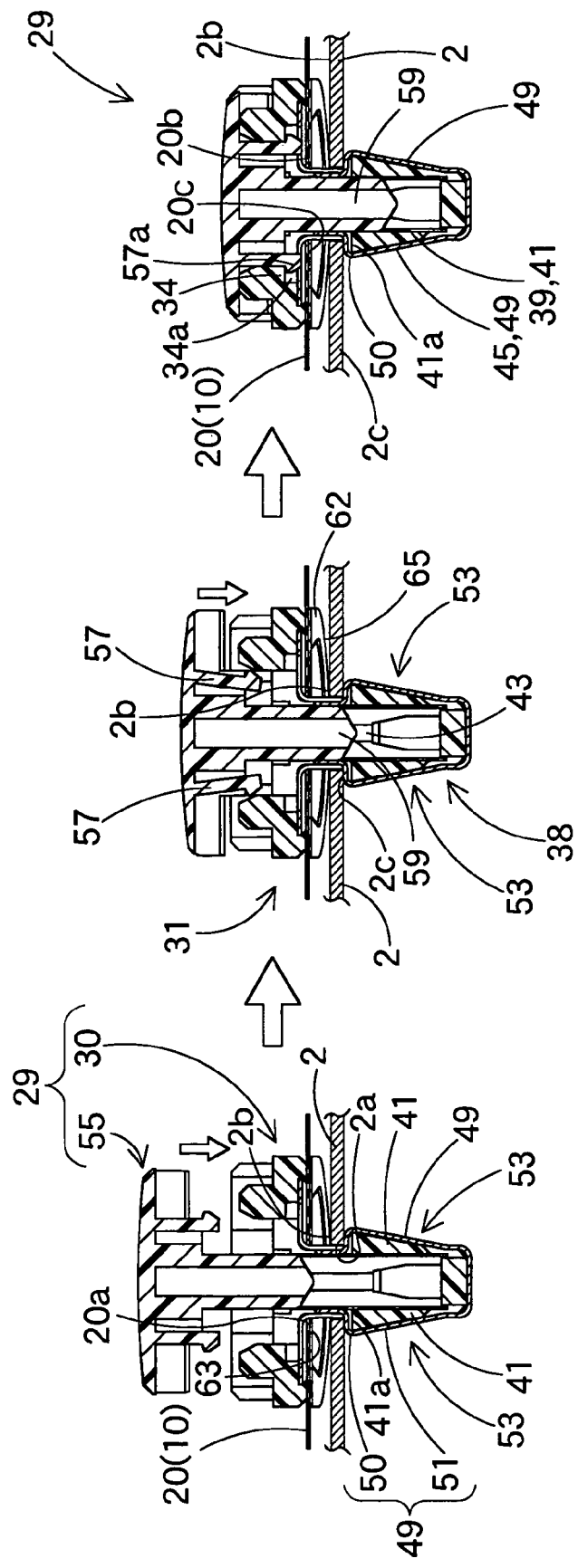

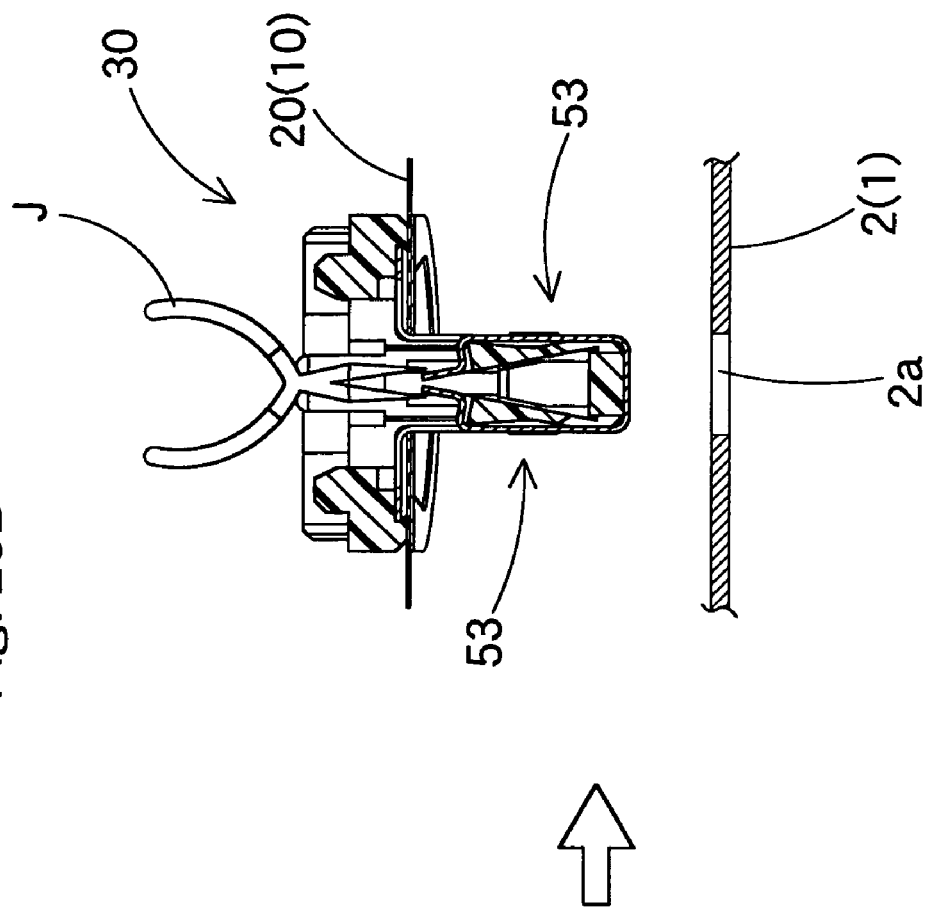
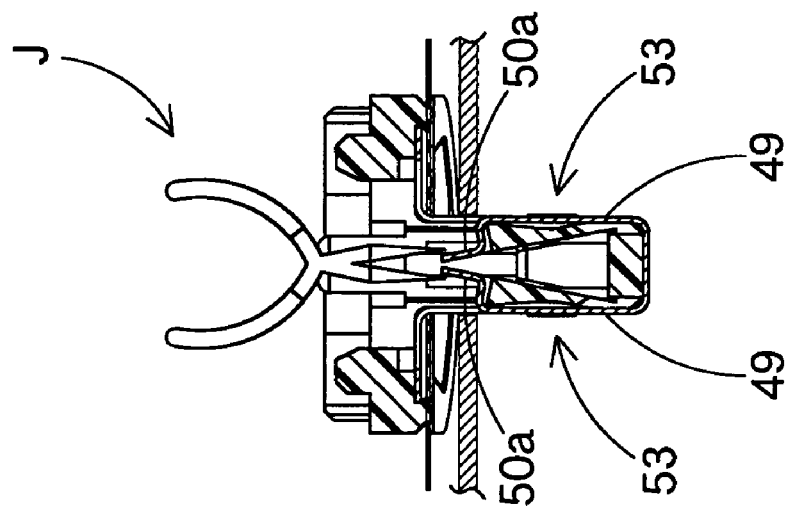
Fig. 20A
Fig. 20B

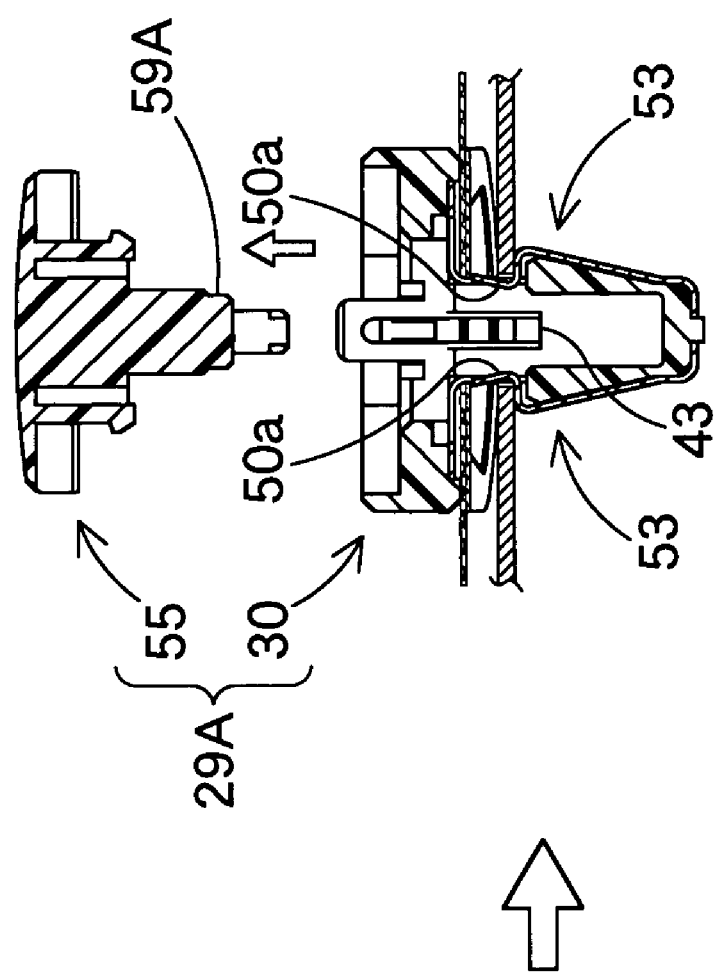
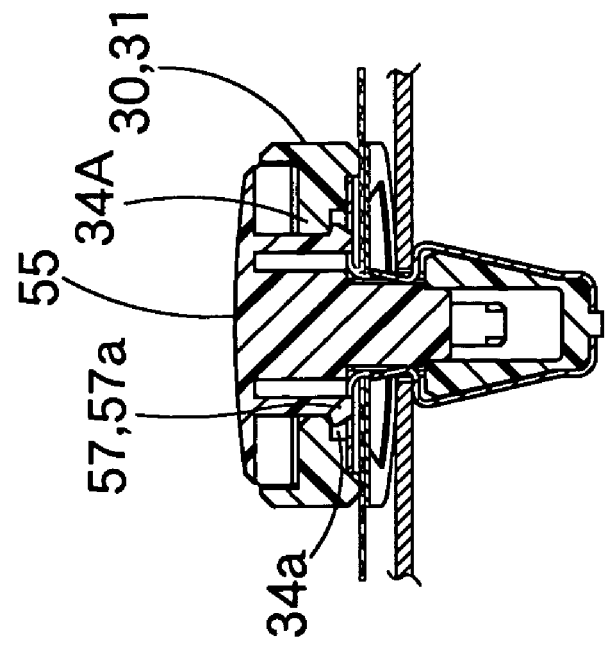
Fig. 39A
Fig. 39B

HEAD PROTECTING AIRBAG DEVICE

The present application claims priority from Japanese Patent Application No. 2004-280264 of Ikeda et al., filed on Sep. 27, 2004, the disclosure of which is hereby incorporated into the present application by reference.

BACKGROUND OF THE INVENTION

1. Field of the Invention

The present invention relates to a head protecting airbag device provided with an air bag which develops and expands downward by expansion gas flowed in from the upper side of side windows inside a vehicle so that the head of a passenger can be protected.

2. Description of Related Art

Conventionally, in a head protecting air bag device, an air bag has been housed in the upper side of side windows, being folded in a state where its plural attaching portions are fixed to fixing part of vehicle body, and mounted in the vehicle. This air bag develops and expands to cover the side window when the expansion gas flows in.

As a structure for attaching attaching portions of the air bag to the fixing part of the vehicle body, there has been a structure of using a clip without using a bolt which takes a time and labor for mounting. This clip permits snap fixing with one touch operation. The clips attached to predetermined attaching portions of the air bag of the head protecting air bag device are mounted on the vehicle (For example, JP-A-10-203289). This clip is provided with a pair of securing legs. The pair of securing legs, when they are inserted into a fixing slot formed at in the fixing part of the vehicle body via an attaching slot formed in the attaching portion, warp to approach each other, and then restore their original state so that they are secured to out-vehicle side peripheral edge on the of the fixing slot.

However, in the conventional head protecting air bag device, the clip is made of synthetic resin. When the air bag expands after having been mounted on the vehicle, abrupt downward tensile stress acts on the clip. At this time, the securing legs are scraped off by the peripheral edge of the fixing slot formed in the fixing part of the vehicle body, the fixing part generally being a part of an inner panel of steel. As a result, there is a fear that the clip comes off from the fixing slot. Further, the conventional clip also gives a fear of strength reduction due to heat deterioration. Thus, the conventional clip presented a problem to be solved about attaching an airbag to the vehicle body with assured stability.

Incidentally, in order to solve this problem, there is a proposal of using a metallic clip. However, if a material for the metallic clip is of a plate thickness that can be subject to bending, a part of the securing legs is likely to be bent when the air bag develops and expands like the clip of synthetic resin. If it is bent, a fear of the clip coming off from the fixing slot occurs. In this case, if the thickness is increased in order to prevent the bending, the load for inserting the clip into the fixing slot becomes too large. As a result, the metallic clip having a large thickness will deteriorate the workability of mounting the air bag on the vehicle.

SUMMARY OF THE INVENTION

The present invention has been accomplished in order to solve the above problem. An object of the present invention is to provide a head protecting air bag device capable of easily attaching the attaching portions of an air bag to vehicle body with assured attaching stability.

The head protecting air bag device according to the present invention, which is provided with an air bag and a plurality of clips, is mounted on a vehicle. The air bag, being folded, is housed in the upper side of side windows. When expansion gas flows in, the air bag develops and expands to cover the side window. The air bag has a plurality of attaching portions, each having an attaching slot, to be attached to the fixing part of part of vehicle body. Each clip is inserted into a fixing slot formed in the fixing part of vehicle body via the attaching slot and secured thereat. The clip includes a clip body and a locking part detachably engaged with the clip body. The clip body includes a shaft and a head. The shaft has a pair of securing legs protruded from tip side to base side of the shaft. The securing legs are inserted into the fixing slot from in-vehicle side via the attaching slot, while warping to approach each other, and then restore from mutually approached state, so that they are secured to out-vehicle side peripheral edge of the fixing slot. The head is coupled with the base side of the shaft. The head attaches the attaching portion of the airbag to the fixing part of vehicle body by holding down and position limiting a periphery of the attaching slot of the air bag onto in-vehicle side periphery of the fixing slot, when the pair of securing legs is secured to the out-vehicle side peripheral edge of the fixing slot. The locking part includes a spacer and an engagement area. The spacer is inserted in between the pair of securing legs so as to prevent the pair of securing legs secured at the out-vehicle side peripheral edge of the fixing slot from approaching each other. The engagement area, which serves to engage the locking part with the clip body, allows the locking part to be detached from the clip body when an insertion of the spacer in between the pair of securing legs is completed.

The shaft is formed as a double layer structure including a shell member of metallic plate and a core member of synthetic resin. The shell member extends toward both sides from tip side of the shaft to continuously constitute an outer surface of the pair of securing legs. The core member is arranged in the inner periphery of the shell member.

The shell member includes a pair of securing lugs each of which includes a securing step engageable in the out-vehicle side peripheral edge of the fixing slot, and a supporting rod extending toward tip side of the shaft from the securing step. The core member includes a pair of supporting pieces. The pair of supporting pieces are arranged in such a manner as to extend toward both sides from tip side of the shaft to continuously constitute an inner periphery of the pair of securing legs. The pair of supporting pieces are arranged in opposite sides of the securing lugs in such a manner as to support rear sides of the securing steps of the shell member. The pair of supporting pieces has an inserting space therebetween into which the spacer of the locking part is inserted. When the spacer is inserted into the inserting space, the supporting pieces are brought into contact with the spacer and the securing lugs, so that the securing lugs are prevented from moving toward each other.

In the head protecting air bag device according to the present invention, when each of the attaching portions of the air bag is attached to the fixing part of the vehicle body, the shaft of the clip body is inserted into the fixing slot in the fixing part of the vehicle body from in-vehicle side via the attaching slot of the attaching portion of the air bag, thereby the pair of securing legs are retained by out-vehicle side peripheral edge of the fixing slot. And the spacer of the locking part is inserted into the inserting space between the securing legs to engage the engagement area of the locking part to the clip body. Then, a peripheral edge of the attaching slot of the attaching portion of the air bag is held down to in-vehicle side peripheral edge of the fixing slot by the head of the clip body, so that the peripheral edge of the attaching slot and that of the fixing slot are position-controlled between the head and the pair of securing legs of the clip body. As a result, the attaching portions of the air bag are attached and fixed to the fixing part of the vehicle body.

At this time, the pair of securing legs are first inserted into the fixing slot in the fixing part of the vehicle body in a state where the spacer of the locking part is still not inserted in between the securing legs. For this reason, the clip permits the attaching portion of the air bag to be fixed to the vehicle body side while suppressing increase in the inserting load into the fixing slot.

Of course, after the attaching portions are fixed, the securing legs are prevented from approaching each other, since the spacer of the locking part is inserted in between the securing legs. Thus, the securing legs are prevented from coming off from the fixing slot.

Particularly, in the present invention, the pair of securing legs are composed of the shell member of a metallic plate on the outer periphery and the core member of synthetic resin on the inner periphery. The supporting pieces of the core member support the securing lugs of the shell member in such a manner as to fill a gap between the securing lugs from rear sides of the securing steps to the shaft tip side on the inner periphery of the supporting rods. Therefore, when the air bag develops and expands, tensile stress acts on the supporting rods of the metallic plate in a direction of the clip coming off from the fixing slot, i.e. in an orientation of an axis of the shaft of the clip. As a result, even when the supporting rods of the metallic plate intend to buckle (bend), as enforcement against it, the supporting pieces can cope with the tensile stress. As a result, even if the securing lugs inclusive of the supporting rods are formed of a thin metallic plate that can be easily bent, the pair of securing legs will not come off from the fixing slot, so that the attaching portion of the air bag is firmly attached to the fixing part of the vehicle body.

Further, when viewed from the core member of synthetic resin, the supporting pieces are covered with the securing steps of metallic plate. For this reason, scraping of the supporting pieces by the out-vehicle side peripheral edge of the fixing slot can be prevented, and an influence of decrease in resin strength due to heat deterioration is reduced. As a result, the securing lugs are stably supported by the core member of synthetic resin.

Further, after having been attached to the fixing part of the vehicle body, each of the attaching portions of the air bag is removed from the vehicle body as follows. First, an engagement of the locking part to the clip body is released to pull out the spacer from the inserting space between the securing legs. Thereafter, the clip body has only to be pulled out from the fixing slot, with the pair of securing legs brought closer to each other, so that the attaching portion of the air bag can be removed from the fixing part of the vehicle body.

For the reasons described above, in the head protecting air bag device according to the present invention, the attaching portions of the air bag are easily attached to the vehicle body side with assured attaching stability. Further, the attaching portion of the air bag after having been attached can be easily removed.

And the air bag device may employ a hold-down plate having an assembling slot with an opening similar to that of the fixing slot and having an outer shape larger than that of the attaching slot. When this hold-down plate is employed, the pair of securing legs of the clip are penetrated through the assembling slot of the hold-down plate via the attaching slot of the attaching portion of the air bag so as to be retained at the peripheral edge of the assembling slot. The peripheral edge of the attaching slot and that of the assembling slot are arranged between the pair of securing legs and the head. Thus, the clip can be assembled with the attaching portion of the air bag before attachment of the airbag to the fixing part of the vehicle body side. In other words, in accordance with such a configuration, before the attachment of the airbag to the vehicle body side, the hold-down plate permits the air bag and the clip to be integrated so that missing of the clip etc. is prevented. As a result, the hold-down plate facilitates handling of the air bag device.

In this case, the hold-down plate is desirably made of spring steel, and includes a hold-down plate segment having the assembling slot and a ring-shaped deformed plate segment arranged around the hold-down plate segment, the hold-down plate segment and the deformed plate segment being coupled with coupling pieces. Further, in this hold-down plate, preferably, the deformed plate segment is arranged at a position displaced toward the out-vehicle side from the hold-down plate segment with respect to the coupling pieces.

In accordance with such a configuration, when the clip is inserted in the fixing slot of the vehicle body side to be attached to the vehicle body side, the deformed plate segment of the hold-down plate is pressed onto in-vehicle side peripheral edge of the fixing slot, thereby absorbing errors in the plate thickness of the peripheral edge of the fixing slot of the vehicle body.

Further, preferably, the locking part is provisionally held by the clip body before the spacer is inserted in between the pair of securing legs. In accordance with such a configuration, the locking part will not come off from the clip body, thus facilitating handling of the clip.

In this case, the locking part is preferably provided with a securing part which, while the locking part is provisionally held by the clip body, hold the pair of securing legs in a mutually approached state so as to allow the securing legs to pass through the fixing slot, and, when the spacer is inserted into the inserting space, releases the securing legs from the mutually approached state. In accordance with such a configuration, the load of inserting the clip into the fixing slot can be greatly reduced, thereby further facilitating mounting of the air bag in the vehicle.

The air bag device having such a configuration may also employ a hold-down plate of spring steel having an assembling slot with an opening similar to that of the fixing slot and having an outer shape larger than that of the attaching slot. The hold-down plate includes a hold-down plate segment having the assembling slot and a ring-shaped deformed plate segment arranged around the hold-down plate segment, the hold-down plate segment and the deformed plate segment being coupled with coupling pieces. The hold-down plate segment is formed to be securable to the head of the clip. The deformed plate segment is arranged at a position displaced toward the out-vehicle side from the hold-down plate segment with respect to the coupling pieces. The clip is combined with the attaching portion of the air bag before being attached to the fixing part of the vehicle body in such a manner that the pair of securing legs are penetrated through the assembling slot of the hold-down plate via the attaching slot of the attaching portion of the air bag, and that the hold-down plate segment is retained by the head of the clip. If such a hold-down plate is employed, before attachment of the airbag to the vehicle body side, the air bag and the clip can be integrated so that missing of the clip etc. can be prevented, thereby facilitating handling of the air bag device. Further, when the clip is inserted in the fixing slot to be attached to the vehicle body, the deformed plate segment of the hold-down plate is pressed onto in-vehicle side peripheral edge of the fixing slot, thereby absorbing errors in the plate thickness of the peripheral edge of the fixing slot on the vehicle body.

BRIEF DESCRIPTION OF THE DRAWINGS

FIGS. 15A, 15B and 15C illustrate, in order, an attaching processes of the clip in the embodiment of the present invention to an attaching portion of the air bag, and to the vehicle body;

FIGS. 16A, 16B and 16C illustrate, in order, the attaching processes of the attaching portion of the air bag to the vehicle body by the clip, which follow FIG. 15C;

FIGS. 20A and 20B illustrate, in order, the removal of the clip in the embodiment of the present invention from the vehicle body, which follow FIG. 19C;

FIGS. 39A and 39B illustrate, in order, removal of the clip in the modification shown in FIG. 21.

DESCRIPTION OF THE PREFERRED EMBODIMENT

With reference to accompanying drawings, a description will be given of preferred embodiments of the present invention. However, the invention is not limited to the embodiments described herein. All modifications within the appended claims and equivalent relative thereto are intended to be encompassed in the scope of the claims.

Figure 1:
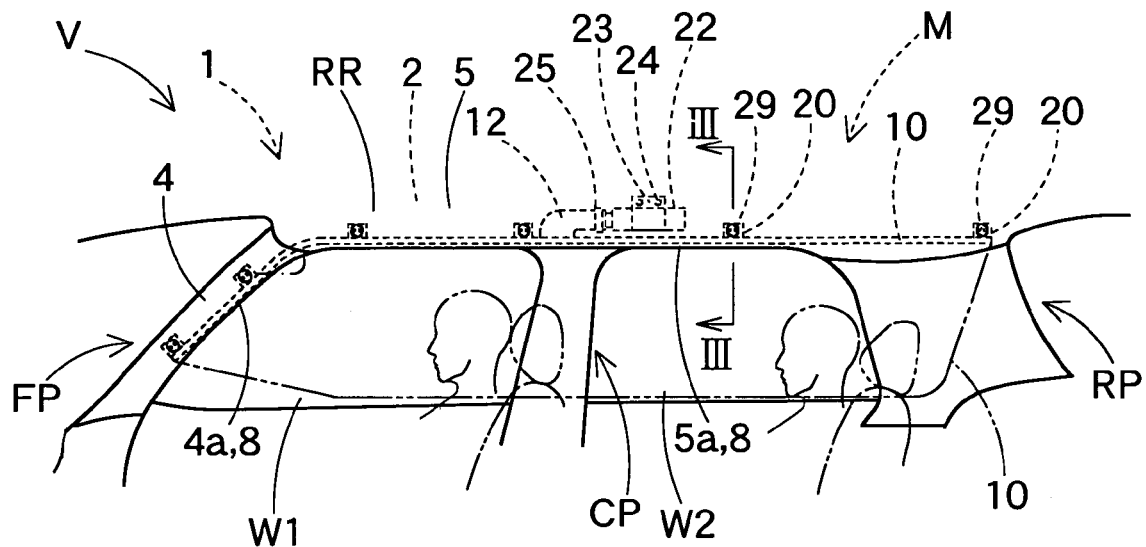
FIG. 1 is a schematic front view of a head protecting air bag device according to an embodiment of the present invention in a state being mounted in a vehicle.

A head protecting air bag device M according to an embodiment of the present invention, as seen from FIG. 1, is mounted in a vehicle V, and includes an air bag 10, clips 29, an inflator 22, an attaching bracket 23 and an air bag cover 8. On the upper side of side windows W1, W2 inside the vehicle V, the air bag 10 is housed in a folded state within the range from the lower edge of a front pillar FP to the upper side of a rear pillar RP via the lower edge of a roof side rail RR.

Figure 2:
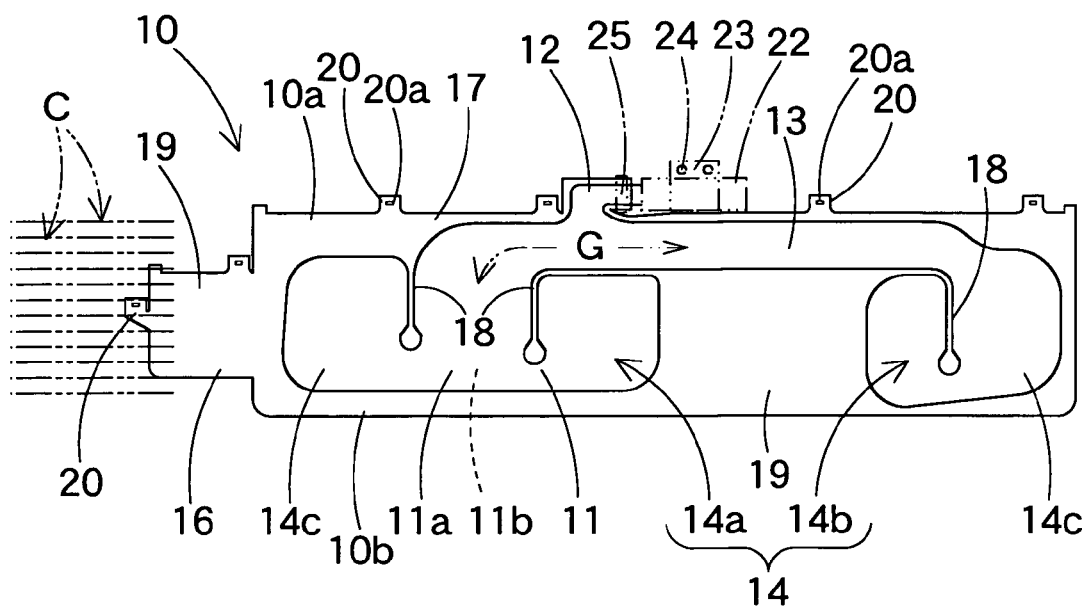
FIG. 2 is a front view of the air bag in the embodiment of the present invention.

The inflator 22, as seen from FIGS. 1 and 2, is generally cylindrical. A connection mouth 12 of the air bag 10 is mounted around the inflator 22 for taking in expansion gas. The inflator 22 is coupled with the air bag 10 by a clamp 25. Using the attaching bracket 23, the inflator 22 is firmly fixed to an inner panel 2 of the roof side rail RR in the vicinity of the upper part of a center pillar CP. The inflator 22 is covered with a lower edge 5a of a roof head lining 5. Incidentally, the inner panel 2 is a member on the body side of the vehicle V. Later-described attaching portions 20 of the air bag 10 are also attached to the inner panel 2. The attaching bracket 23, which is made of a metallic plate, holds the inflator 22. The bracket 23 is fixed to the inner panel 2 using attaching bolts 24.

The air bag cover 8 includes respective lower edges 4a and 5a of a pillar garnish 4 arranged on the front pillar FP, and a roof head lining 5 arranged on the roof side rail RR. Incidentally, the front pillar garnish 4 and the roof head lining 5 are made of synthetic resin, and firmly fixed to inner side of the inner panel 2 of the body 1 in the front pillar FP and roof side rail RR, respectively. The roof head lining 5 is extended from the vicinity of the upper part of the front pillar FP to the vicinity of the upper part of the rear pillar RP, via the upper part of the center pillar CP.

Figure 3:
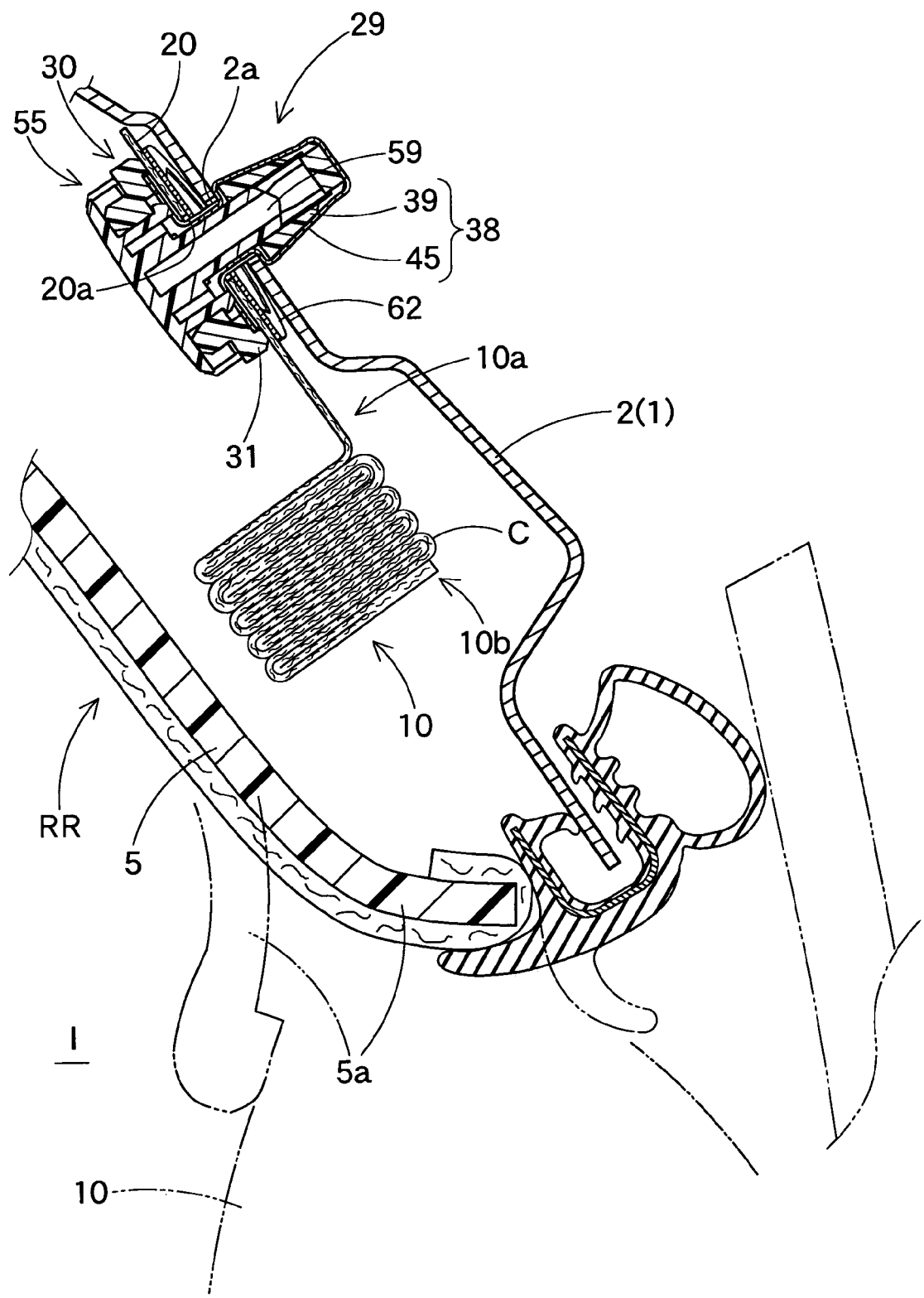
FIG. 3 is a schematic partial longitudinal sectional view of a head protecting air bag device according to the embodiment of the present invention in a state being mounted in a vehicle, which is taken along line III-III in FIG. 1.

The air bag 10, as seen from FIGS. 1 to 3, has flexibility and is formed of a woven cloth of e.g. polyamide threads by hollow-weaving method. The air bag 10 is adequately coated, on its outer surface, with a coating layer of e.g. silicon rubber for preventing gas leakage. The air bag 10 develops and expands from its folded state owing to inflow of expansion gas G from the inflator 22. Thus, the air bag 10 covers the side windows W1, W2 within the vehicle, and respective pillar garnishes 7 and 6 of the center pillar CP and the rear pillar RP. The air bag 10 is provided with a gas inflow part 11 which expands to separate an in-vehicle side wall 11a and out-vehicle side wall 11b owing to inflow of the expansion gas G and a gas non-inflow part 16 which admits no expansion gas G.

In this embodiment, the gas inflow part 11 includes a connection mouth 12, a gas supply path 13 and a protection expansion portion 14. The gas supply path 13 is straightly arranged in the longitudinal direction of the vehicle V along an upper edge 10a of the air bag 10. At a nearly middle position in the longitudinal direction of the gas supply path 13, the connection mouth 12 extending upward is formed. The connection mouth 12 causes the expansion gas G from the inflator 22 to flow into the gas inflow part 11. In the gas supply path 13, when the expansion gas G flows in from the connection mouth 12, it flows toward both sides in the longitudinal direction of the vehicle V. The protection expansion portion 14 is an area for protecting the head of a passenger seated on a seat of the vehicle V. The protection expansion portion 14, when the development and expansion of the air bag 10 has been completed, is arranged below the gas supply path 13. The protection expansion portion 14 has a front zone 14a which is arranged aside the front seat of the vehicle V to cover the side window W1 aside the front seat, and a rear zone 14b which is arranged aside the rear seat of the vehicle V to cover the side window W2 aside the rear seat. Further, the front and rear zones 14a and 14b are provided with a plurality of expandable cells 14c arranged side by side in the longitudinal direction.

The non-inflow part 16 is formed to couple the walls 11a and 11b of the gas inflow part 11 with each other. The non-inflow part 16 includes a peripheral edge 17, partitioning segments 18, plate areas 19 and attaching portions 20. The peripheral edge 17 is arranged on the outer periphery of the air bag 10 so as to surround the periphery of the gas inflow part 11.

The plate areas 19 each formed in a generally rectangular plate shape are arranged below the gas supply path 13 between the front and rear zones 14a and 14b of the protection expansion portion 14, and at the front end of the air bag 10. These plate areas 19 are arranged to define the entire shape of the air bag 10 and to decrease a volume of the gas inflow part 11 thereby shortening the time taken until the expansion is completed.

The partitioning segments 18 are arranged in plurality. These partitioning segments 18 are arranged in order to partition the gas supply path 13 and protection expansion area 14, or arranged within the region of the protection expansion portion 14 to separate the front and rear zones 14a and 14b into respective cells 14c. Incidentally, if the protection expansion portion 14 are partitioned into the cells 14c arranged side by side in the longitudinal direction, when the development/expansion is completed, a thickness of the air bag 10 can be controlled and the air bag 10 can be expanded in a plate shape, and tension in the longitudinal direction can be created on the side of the lower edge 10b of the air bag 10 in a state attached to the vehicle V.

The attaching portions 20 are arranged in plurality (six, in this embodiment) to protrude from the peripheral edge 17 on the side of upper edge 10a of the air bag 10. The clips 29 are attached to these attaching portions 20. The attaching portions 20 serve to attach the air bag 10 to the inner panel 2 on the side of the vehicle body 1 using the clips 29 (see FIGS. 1 to 4). Each of the attaching portions 20 has an attaching slot 20a which is a rectangular opening penetrating in the inside-outside direction of the vehicle.

Each of the clips 29, as seen from FIGS. 4, 15A, 17 and 18, includes a body (clip body) 30 and a locking part 55 detachably engaged with the clip body 30. The clip body 30, as seen from FIG. 15A, includes a head 31 and a shaft 38. The locking part 55, as seen from FIGS. 4 and 10 to 14, includes a top 56 and a spacer 59. In the light of material, the clip body 30, as seen from FIG. 4, includes a synthetic resin segment 30a made from synthetic resin such as polyester, and a metallic segment 30b which serves as a shell member 45 and is made of a metallic plate formed by bending a steel plate.

The shaft 38, as seen from FIGS. 15A to 15C, is protruded from the vicinity of the center of the head 31 of the clip body 30. The shaft 38 has a pair of securing legs 53 protruded in such a manner as to expand towards both sides from a tip side 38a to a base side 38b. If the pair of securing legs 53, as seen from FIGS. 15A to 15C and 16A, are inserted into a fixing slot 2a of the inner panel 2 via the attaching slot 20a of the attaching portion 20 of the air bag 10 from the in-vehicle side, they warp to approach each other. Thereafter, when they pass through the fixing slot 2a, they restore their original state so that they are secured to the out-vehicle peripheral edge 2c of the fixing slot 2a of the inner panel 2.

The head 31 is coupled with the base side 38b of the shaft 38. The head 31, when the pair of securing legs 53 are secured to the out-vehicle side peripheral edge 2c of the fixing slot 2a, controls a position of the peripheral edge of the attaching slot 20a of the air bag 10 by holding the peripheral edge of the attaching slot 20a down to the in-vehicle side peripheral edge 2b of the fixing slot 2a. The head 31 serves as a part for attaching the attaching portion 20 to the inner panel 2 serving as fixing parts on the vehicle body 1 side. The head 31, as seen from FIGS. 4 to 9, includes a generally elliptical plate shaped bottom wall 32 having an inserting slot 33 opened at the center, and a peripheral wall 36 which protrudes from the outer edge of the bottom wall 32 in a direction leaving the shaft 38. The inserting slot 33 has a generally rectangular opening 33a, and the spacer 59 of the locking part 55 is inserted into the inserting slot 33 from the opening 33a.

Figure 4:
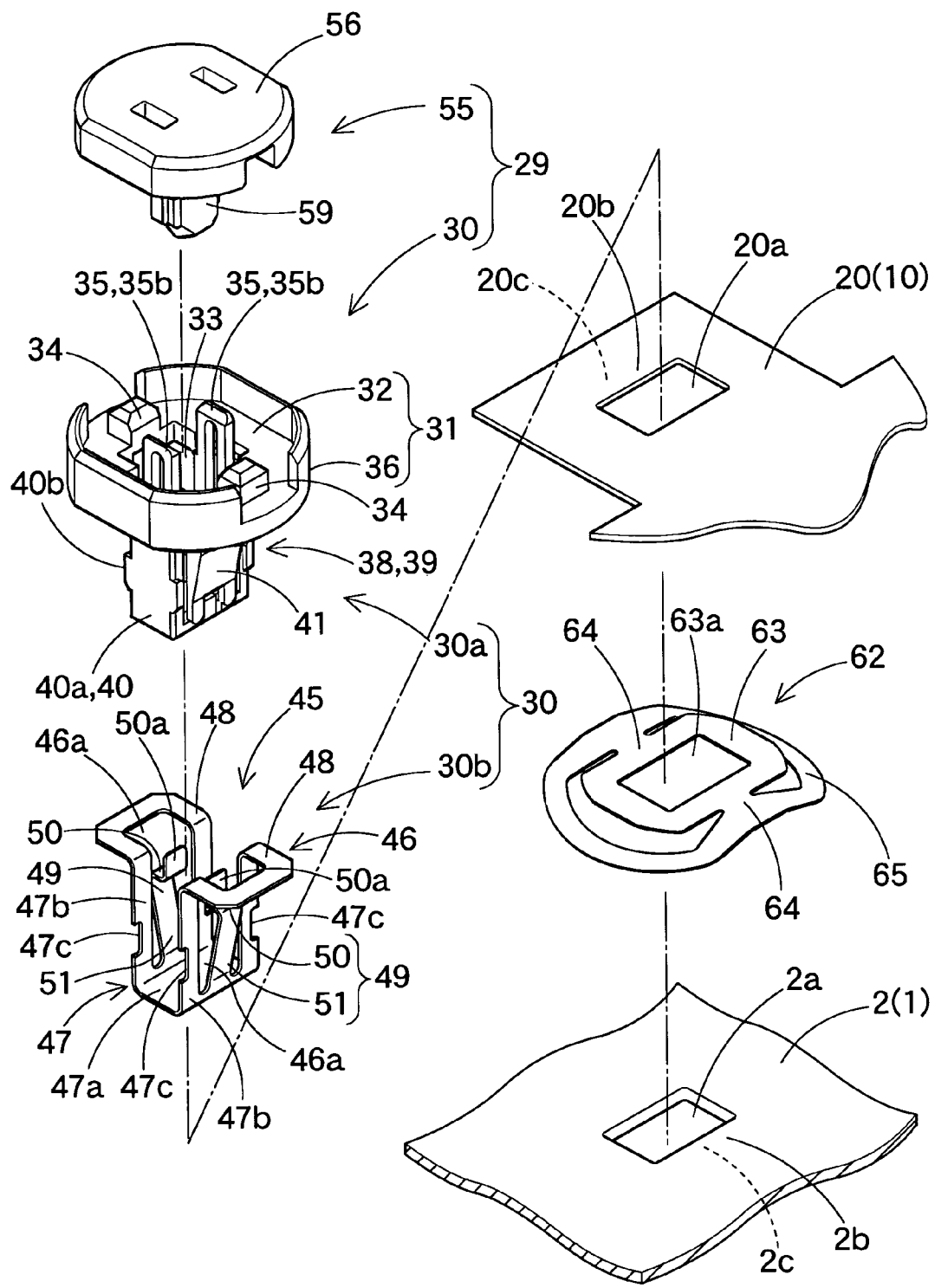
FIG. 4 is an exploded perspective view of the vicinity of a clip in the embodiment of the present invention.
Figure 5:
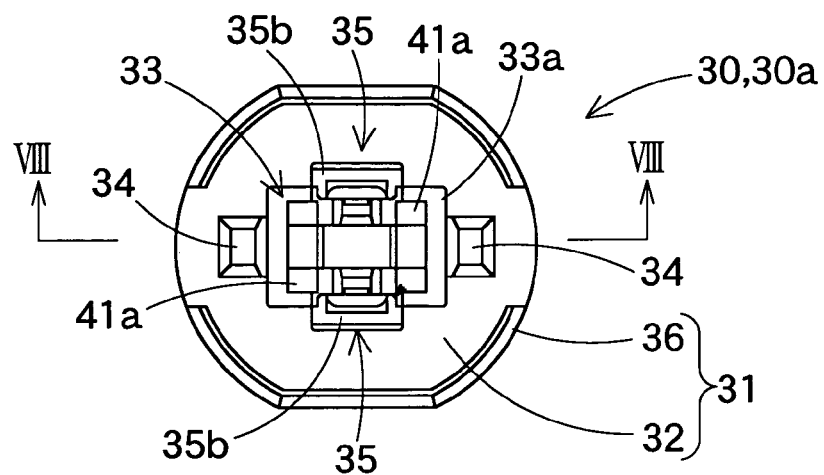
FIG. 5 is a plan view of a clip body (resin portion) without a shell member in the clip in the embodiment of the present invention.
Figure 6:
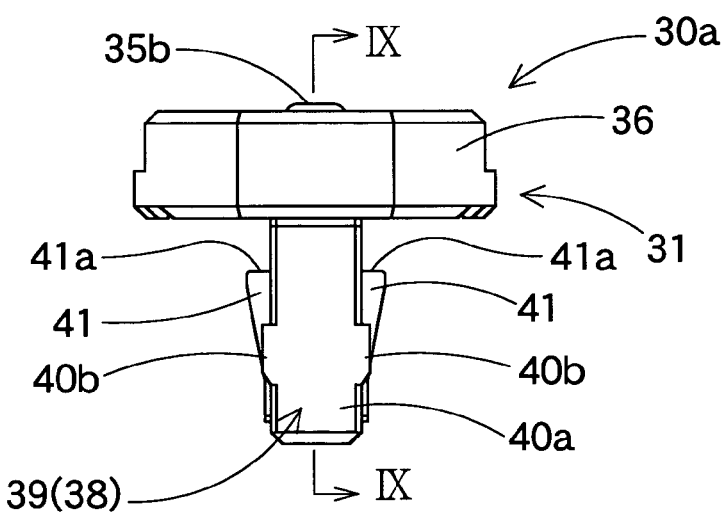
FIG. 6 is a front view of the clip body without a shell member in the clip in the embodiment of the present invention.
Figure 7:
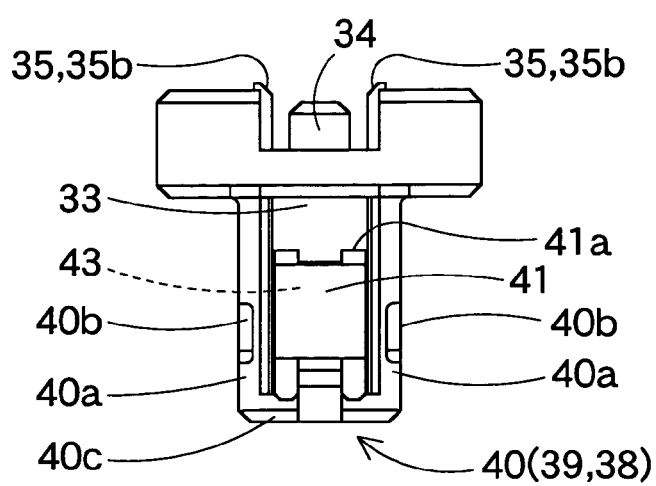
FIG. 7 is a side view of the clip body without a shell member in the clip in the embodiment of the present invention.
Figure 8:
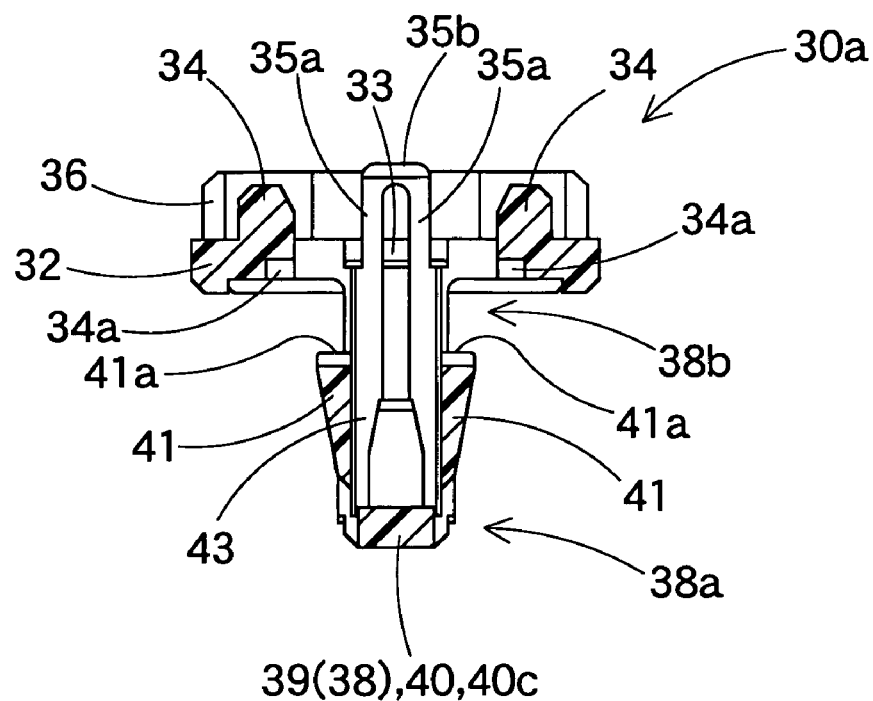
FIG. 8 is a sectional view of the clip body without a shell member in the clip in the embodiment of the present invention, which is taken along line VIII-VIII in FIG. 5.
Figure 9:
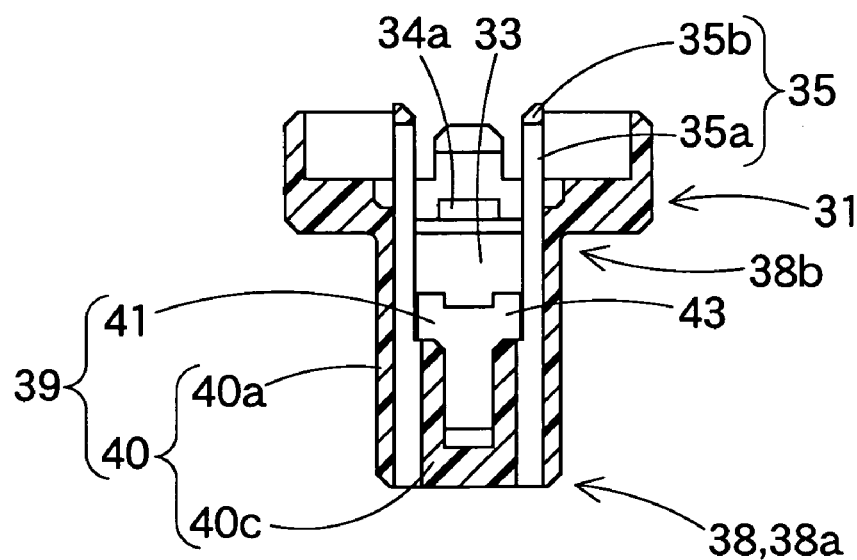
FIG. 9 is a sectional view of the clip body without a shell member in the clip in the embodiment of the present invention, which is taken along line IX-IX in FIG. 6.
Figure 10:
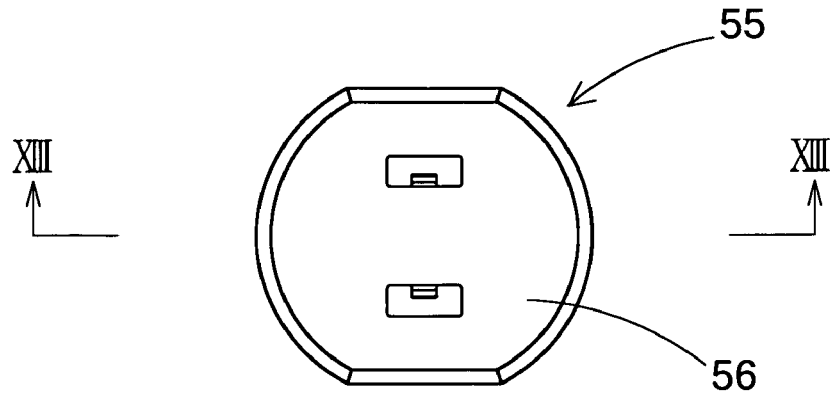
FIG. 10 is a plan view of a locking part of the clip in the embodiment of the present invention.
Figure 11:
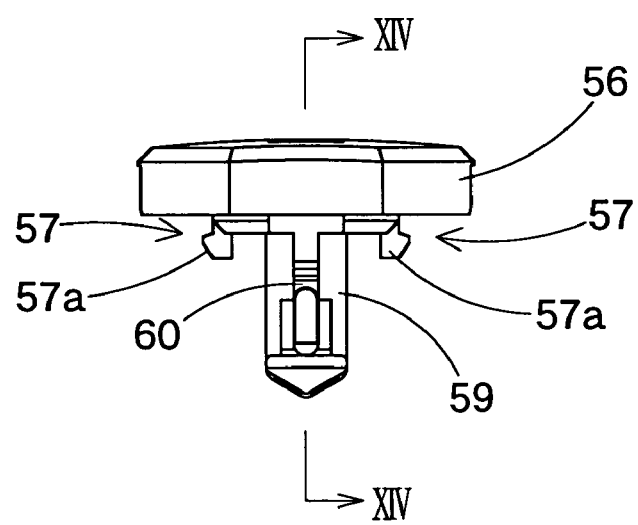
FIG. 11 is a front view of the locking part of the clip in the embodiment of the present invention.

Referring to FIG. 4, the bottom wall 32 has a pair of engagement corresponding pieces 34 and a pair of provisional holding pieces 35 opposite to each other, respectively, all of which are protruded from the peripheral edge of the inserting slot 33 in the direction away from the shaft 38. The pair of engagement corresponding pieces 34 and the pair of provisional holding pieces 35 are arranged in such a manner that their opposite directions are displaced in orthogonal directions. The engagement corresponding pieces 34 are arranged at edges on the short sides of the rectangular opening 33a. Each of the engagement corresponding pieces 34, as seen from FIGS. 8 and 16C, is provided with an engaging groove 34a in which a later-described hook-like engagement piece 57a of the locking part 55 can be engaged, at the edge the inserting slot 33 of the bottom wall 32 proximate to the shaft 38. The provisional holding pieces 35 are arranged at the center of edges on the long sides of the rectangular opening 33a. Each provisional holding piece 35 is formed in an inverted U-shape ring shape provided with two vertical bars 35a, and a horizontal bar 35b coupling these vertical bars 35a. As seen from FIG. 18, the horizontal bar 35b of each of the provisional holding pieces 35 is engaged with a provisional holding corresponding area 60 of the locking part 55.

The locking part 55, as seen from FIGS. 4 and 10 to 14, is made from synthetic resin such as polyester similar to that of the synthetic resin segment 30a of the clip body 30. The locking part 55 includes a generally elliptical top 56 which can be fit in the peripheral wall 36 of the clip body 30, and a spacer 59 protruding from the top 56. The spacer 59 has a generally rectangular cross section, thereby can be inserted in the opening 33a. The spacer 59, as seen from FIG. 16, is inserted to fill up a gap between the securing legs 53 so that the pair of securing legs 53 secured on the out-vehicle side peripheral edge 2c of the fixing slot 2a can be prevented from approaching each other. From the top 56, engagement pieces 57 are protruded in the protruding direction of the spacer 59. The engagement pieces 57 are provided with hook-like pieces 57a arranged oppositely to each other. Each engagement piece 57 is engaged in the engaging groove 34a of the engagement corresponding piece 34 of the clip body 30 when the insertion of the spacer 59 into the securing legs 53 is completed (FIG. 16C). Incidentally, this engagement state can be released if the locking part 55 is forcibly pulled out (see FIGS. 19A and 19B).

Figure 12:
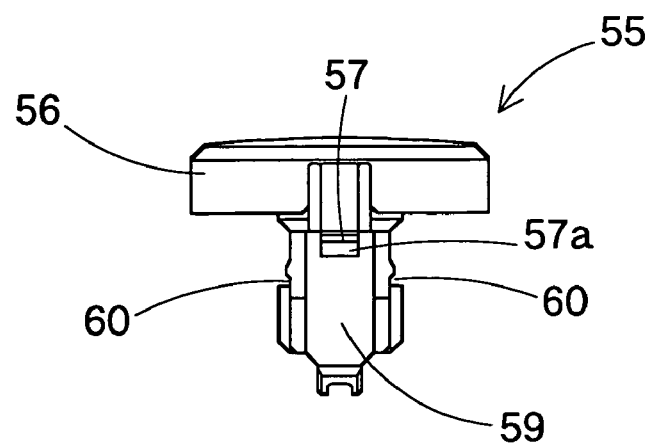
FIG. 12 is a side view of the locking part of the clip in the embodiment of the present invention.
Figure 13:
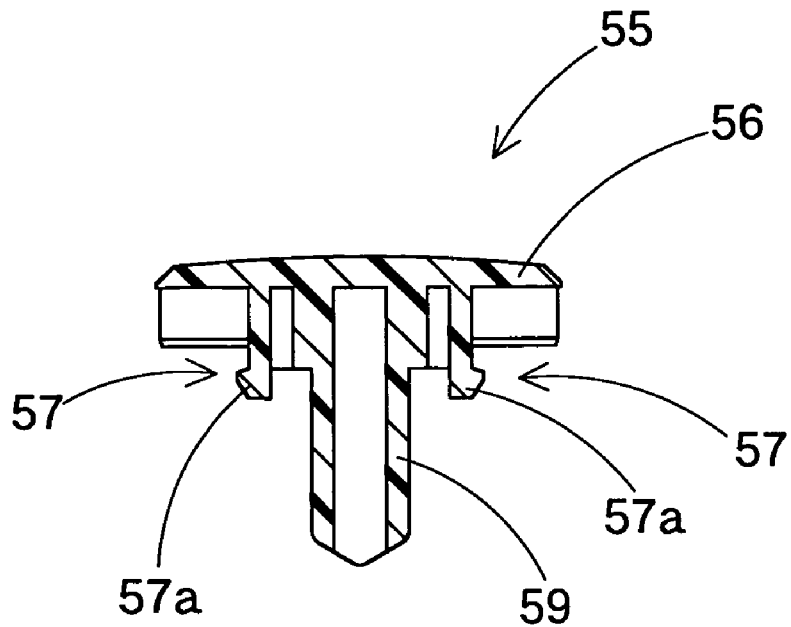
FIG. 13 is a sectional view of the locking part of the clip in the embodiment of the present invention, which is taken along XIII-XIII in FIG. 10.
Figure 14:
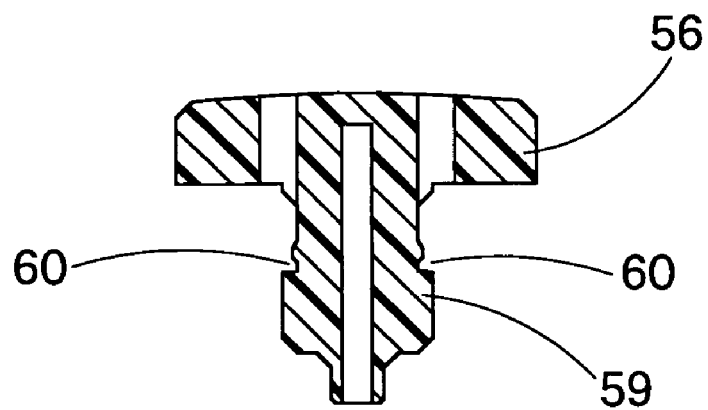
FIG. 14 is a sectional view of the locking part of the clip in the embodiment of the present invention, which is taken along XIV-XIV in FIG. 11.
Figure 17:
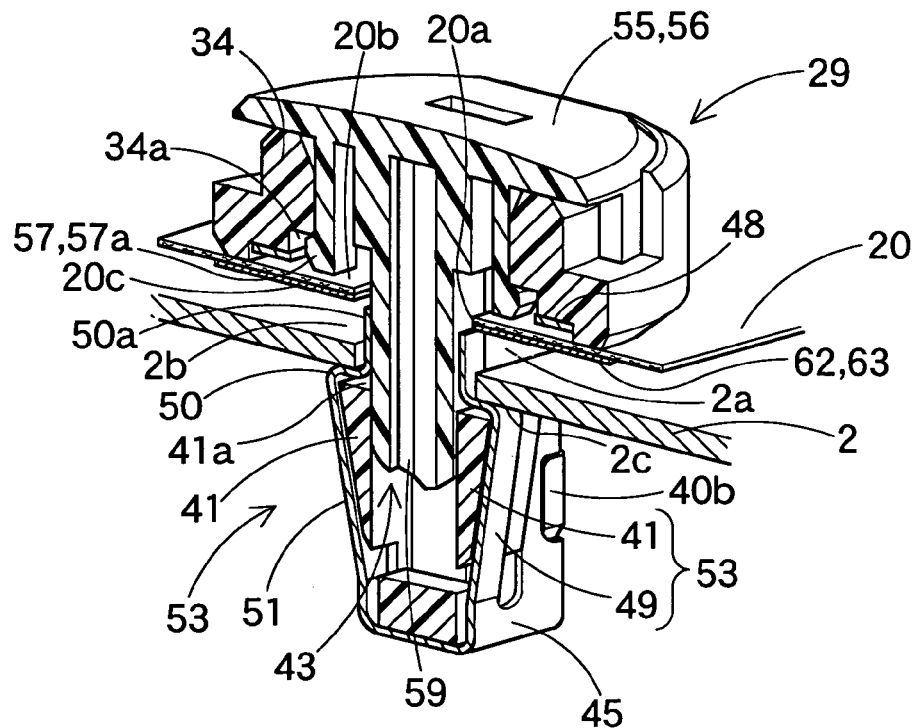
FIG. 17 is a partial sectional perspective view showing a state where the clip in the embodiment of the present invention has been attached to the vehicle body.
Figure 18:
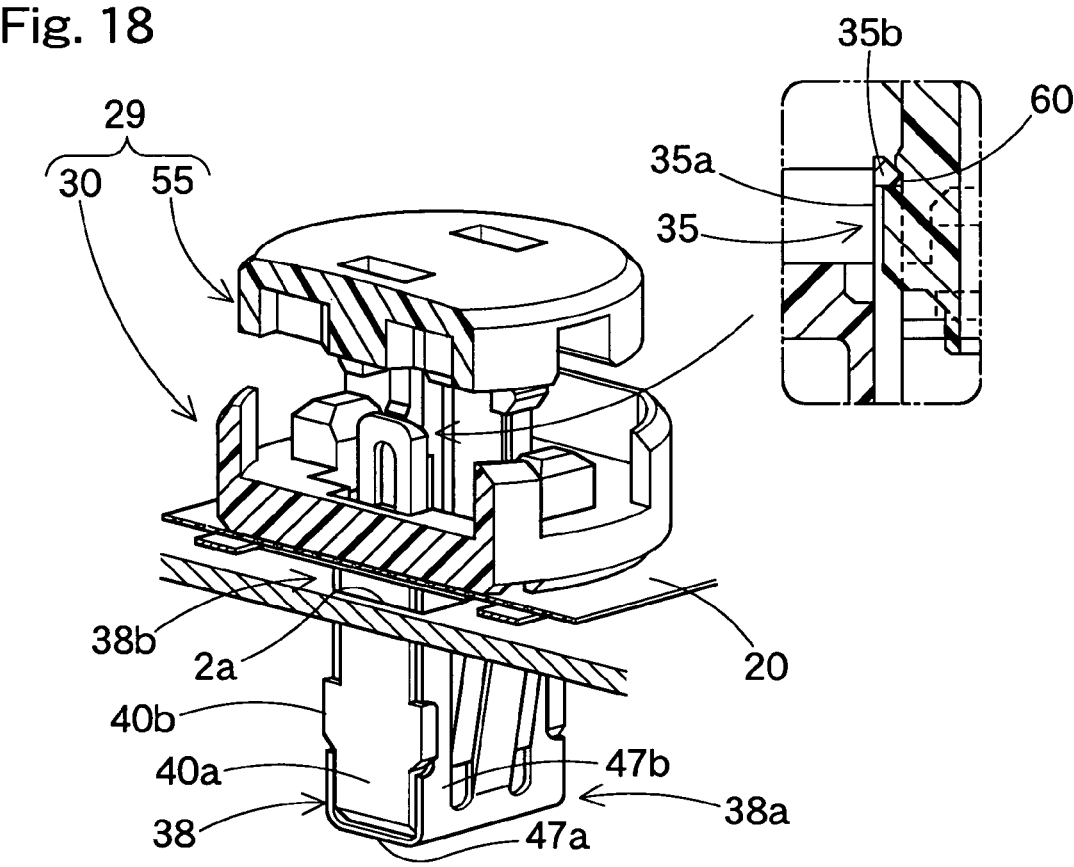
FIG. 18 is a partial sectional perspective view showing a state where, in the clip in the embodiment of the present invention, the locking part is provisionally held to the clip body.

Further, in this embodiment, the spacer 59 is provided with provisional holding corresponding areas 60 at positions in shorter sides of its rectangular cross section (FIGS. 12 and 18). Each provisional holding corresponding area 60 is dented so that the horizontal bar 35b of each provisional holding piece 35 of the clip body 30 can be engaged therein. The horizontal bar 35b is engaged in the provisional holding corresponding area 60 so that the spacer 59 is stopped at a position where the pair of securing legs 53 can approach each other, and so that, when the spacer 59 is pushed into an inserting space 43, this engagement state can be released. Incidentally, the spacer 59 is arranged in such a manner that longer sides of its rectangular cross section are parallel to, or confront, shorter sides of the rectangular openings 33a.

Further, in this embodiment, the shaft 38 inclusive of the pair of securing legs 53 is covered with a shell member 45 of a metallic plate. Incidentally, a portion of the shaft 38 other than the shell member 45 constitutes a core member 39 serving as the synthetic resin segment 30a. The shell member 45, as seen from FIG. 4, is formed by bending a steel plate having a thickness of about 0.5 mm. The shell member 45 includes an assembling substrate 46 and a pair of securing lugs 49.

Further, an outer shape of a cross section of the shaft 38 in a state the securing legs 53 having approached each other are housed in the shaft 38 (which agrees with a contour of a cross section of the core member 39 taken along a portion where later-described side walls 40a are coupled with each other) is formed to be insertable into the fixing slot 2a of the inner panel 2 and attaching slot 20a of the air bag 10, and is a rectangular shape slightly smaller than opening shapes of the slots 2a and 20a.

The assembling substrate 46 includes a U-shape segment 47 and two flanges 48. The U-shape segment 47 includes a bottom wall 47a and side walls 47b which extend oppositely to each other from the bottom wall 47a. The flanges 48 extend from both ends of the U-shape apart from each other in a direction orthogonal to the side walls 47b. The side walls 47b are arranged on longer sides of the rectangular cross section of the shaft 38 in which the securing legs 53 are housed. In each region extending from the side wall 47b to the flange 48 is a punched space 46a. In the space 46a of the side wall 47b, a securing lug 49 is protruded from the bottom wall 47a. In outer edges on both sides of each side wall 47b are assembling dents 47c used to assemble the shell member 45 with the core member 39.

The pair of securing lugs 49, as seen from FIGS. 4 and 16, extend in such a manner as to expand from the tip side 38a to the base side 38b of the shaft 38. The pair of securing lugs 49 continuously constitute an outer surface of the pair of securing legs 53. Each securing lug 49 includes a securing step 50 engageable with the out-vehicle side peripheral edge 2c of the fixing slot 2a, and a supporting rod 51 extending from the engaging step 50 toward the tip side 38a of the shaft 38. Grasping pieces 50a are protruded from tips of the securing steps 50 approaching each other, toward the head 31 of the clip body 30. In pulling out the clip body 30 from the fixing slot 2a (see FIGS. 19C and 20A), the grasping pieces 50a are grasped to cause the pair of securing legs 53, 53 to approach each other.

The core member 39, as seen from FIGS. 4, 5 to 9, and 15, is arranged in the inner periphery of the shell member 45. The core member 39 includes a pair of supporting pieces 41 extending toward both sides in such a manner as to expand from the tip side 38a to the base side 38b of the shaft 38, and a pillar 40 from which the supporting pieces 41 protrude. The core member 39 continuously constitutes an inner periphery of the pair of securing legs 53. As seen from FIGS. 6 to 9, the pillar 40 includes side walls 40a which protrude oppositely from peripheral edge of the inserting slot 33 of the head 31, and a bottom wall 40c which couples tips of the side walls 40a, thereby having an U-shaped section. The side walls 40a protrude from the peripheral edge of the inserting slot 33 in longer sides of the rectangular opening 33a of the inserting slot 30, or on sides where the provisional supporting portions 35 are located. The side walls 40a are located on shorter sides of the rectangular outer shape of the cross section of the shaft 38. The supporting pieces 41 protrude toward the bottom wall 32 from both edges of the bottom wall 40c between the side walls 40a. Assembling projections 40b are protruded from both edges of each of the side walls 40a in a direction orthogonal to the shaft 38. The respective assembling projections 40b are fit in the corresponding assembling dents 47c so that the shell member 45 is assembled with and held by the core member 39. When the shell member 45 is held by the core member 39, the flanges 48 of the shell member 45 are brought into contact with the head 31, the bottom wall 47a in the U-shape segment 47 of the shell member 45 is brought into contact with the bottom wall 40c of the pillar 40, and the supporting pieces 41 are arranged inside the corresponding securing lugs 49.

Each of the supporting pieces 41 has a tip surface 41a for supporting rear side of each of the securing steps 50 when the shell member 45 is held by the core member 39. The pair of supporting pieces 41 are formed in a triangular shape when viewed from side so as to be arranged on opposite sides of the pair of securing lugs 49, 49 when the shell member 45 is held by the core member 39 (see FIGS. 8 and 15). The supporting pieces 41 have an inserting space 43 therebetween in which the spacer 59 can be inserted. When the spacer 59 is inserted thereinto (see FIG. 16), the pair of supporting pieces 41 are brought into contact with the spacer 59 and the securing lugs 49, thereby limiting the movement of the securing lugs 49 in mutually approaching direction.

Further, in the air bag device M in this embodiment, as seen from FIGS. 4, 15A to 15C and 16A to 16C, a hold-down plate 62 is employed in order to attach each of the clips 29 to each of the attaching portions 20 of the air bag 10 before the air bag 10 is attached to the vehicle body 1 side. Each of the hold-down plates 62 is made of spring steel and formed as a flat plate. The hold-down plate 62 includes a hold-down plate segment 63 and a deformed plate segment 65. The hold-down plate segment 63 is located interior of the hold-down plate 62, and formed substantially in a square-ring shape having an assembling slot 63a with a rectangular shape similar to the fixing slot 2a. An outer shape of the hold-down plate segment 63 is made larger than that of the attaching slot 20a of each of the attaching portions 20. The deformed plate segment 65 is coupled with the hold-down plate segment 63 by coupling pieces 64, and formed substantially in a square ring shape arranged around the hold-down plate segment 63. The deformed plate segment 65 is arranged to be deviated from the hold-down plate segment 63 toward the out-vehicle side via the coupling pieces 64.

When the hold-down plate 62 is in service, as seen from FIGS. 15A to 15C, the deformed plate segment 65 is located in a position away from the out-vehicle side peripheral edge 20c of the attaching slot 20a of each attaching portion 20 of the air bag 10, while the assembling slot 63a periphery of the hold-down plate segment 63 is brought into contact with the out-vehicle side peripheral edge 20c. If the attaching slot periphery 20b of the air bag 10 is arranged between the hold-down plate segment 63 and the head 31 in such a manner that the securing legs 53 are penetrated through the assembling slot 63a via the attaching slot 20a and secured in the peripheral edge of the assembling slot 63a, the hold-down plate 62 is attached to the clip 29, and the clip 29 and hold-down plate 62 are attached to the attaching portion 20.

Incidentally, as seen from FIGS. 16A to 16C, when the clip 29 is attached to the inner panel 2 on the vehicle body 1 side, the deformed plate segment 65 warps to be press-fitted to the in-vehicle side peripheral edge 2b of the fixing slot 2a, thereby absorbing an error in the thickness of the inner panel 2.

A rough description will be given on the processing for mounting the air bag device M on the vehicle V. First, the air bag 10 is folded. In this folding, the air bag 10 is developed flat and then corrugation-folded on crest and valley creases C, as indicated by two-dot chain lines in FIGS. 2 and 3, so that a lower edge 10b of the air bag 10 approaches an upper edge 10a. After the air bag 10 has been folded, the air bag 10 is wrapped at a predetermined position by a breakable tape (not shown) for prevention of folding collapse. The clips 29 as well as the hold-down plates 62 are attached to the respective attaching portions 20 of the air bag 10. Further, using a clamp 25, the inflator 22 with the bracket 23 loaded is connected to the connection mouth 12, thereby completing an air bag assembly.

Incidentally, as regards the clip 29, the clip body 30 is first formed. Specifically, the side walls 47b of the U-shape segment 47 of the shell member 45, while being opened, are put on the supporting pieces 41 of the core member 39. Next, the flanges 48 are butted against the bottom wall 32 of the head 31, and the side walls 47b are narrowed from the opened state so that the assembling projections 40b are fitted in the assembling dents 47c. Thus the shell member 45 is assembled with the core member 39, thereby forming the clip body 30. Further, the horizontal bar 35b of each provisional holding piece 35 is engaged with the provisional holding corresponding area 60 so that the locking part 55 is provisionally held by the clip body 30. Further, as described previously (see FIGS. 15A and 15B), the clips 29 as well as the hold-down plates 62 are attached to the respective attaching portions 20 of the air bag 10.

Thereafter, the attaching bracket 23 is arranged at a predetermined position of the inner panel 2 on the vehicle body 1 side and bolt 24 fixed thereto. Each clip 29, as seen from FIGS. 15A to 15C and 16A to 16C, is inserted and secured in each of the fixing slots 2a of the inner panel 2 using the pair of securing legs 53 and spacer 59. Thus, the inflator 22 and the respective attaching portions 20 of the air bag 10 are fixed to the inner panel 2 so that the air bag assembly is attached to the vehicle body 1.

Next, lead wires (not shown) extending from a predetermined control device for operating the inflator are connected to the inflator 22. The front pillar garnish 4 and roof head lining 5 are attached to the vehicle body 1. Further, the rear pillar garnish 6 and center pillar garnish 7 are attached to the vehicle body 1. Thus, the air bag device M can be mounted in the vehicle V.

After the air bag device M is mounted on the vehicle V, if the inflator 22 is operated, as indicated by two-dot chain lines in FIG. 2, the expansion gas G from the inflator 22 flows into the gas supply path 13 from the connection mouth 12 and flows through the gas flow path 13 toward both sides in the longitudinal direction. As a result, the expansion gas G is supplied into each of the cells 14c so that the protection expansion portion 14 of the air bag 10 starts to expand while canceling the creases. And the air bag 10 breaks the wrapping tape and forcibly opens the air bag cover 8 on the lower edges 4a, 5a of the front pillar garnish 4 and roof head lining 5 so that it largely develops and expands so as to cover the in-vehicle sides of the side windows W1, W2, center pillar CP and rear pillar RP while projecting downward, as indicated by two-dot chain lines in FIGS. 1 and 3.

In the head protecting air bag device M according to this embodiment, when the attaching portions 20 of the air bag 10 are attached to the inner panel 2 serving as the fixing part on the vehicle body 1 side, as seen from FIGS. 15A to 15C and 16A, the shaft 38 in each of the clip bodies 30 is inserted into the fixing slot 2a of the inner panel 2 on the vehicle body 1 side from the in-vehicle side via the attaching slot 20a of the air bag attaching portion 20, and the pair of legs 53 are retained at the out-vehicle side peripheral edge 2c of the fixing slot 2a. Subsequently, as seen from FIGS. 16B, 16C and 17, the locking part 55 is pressed in so that the spacer 59 is inserted into the inserting space 43 between the securing legs 53 and the hook-like pieces 57a of the engagements 57 of the locking part 55 are engaged in the dent grooves 34a of the engagement corresponding pieces 34 of the clip body 30.

At this time, the peripheral edge 20c of the attaching slot 20a of the air bag attaching portion 20 is held onto the in-vehicle side peripheral edge 2b of the fixing slot 2a. And the peripheral edges 20b, 20c of the attaching slot 20a and the peripheral edges 2b, 2c of the fixing slot 2a are position-controlled between the head 31 and the pair of securing legs 53 of the clip body 30 via the hold-down plate 62. As a result, each attaching portion 20 of the air bag 10 is attached and fixed to the inner panel 2 as part of the vehicle body 1.

Further, after the fixation, the spacer 59 of the locking part 55 engaged with the clip body 30 is inserted in the inserting space 43 between the securing legs 53. Thus, the pair of securing legs 53 are prevented from approaching each other, and prevented from coming off from the fixing slot 2a.

Particularly, in this embodiment, the pair of securing legs 53 are formed of the shell member 45 of metallic plate on the outer side and the core member 39 of synthetic resin on the inner side. Further, in the securing lugs 49 of the shell member 45, the rear faces of the securing steps 50 which hold the out-vehicle side peripheral edge 2c of the fixing slot 2a are supported by the tip faces 41a of the supporting pieces 41. Further, the securing lugs 49 are supported by the supporting pieces 41 of the core member 39 in such a manner that the supporting pieces 41 fill a space from the rear face side of the securing steps 50 to the shaft tip 38a side inside the supporting rods 51, i.e. to the bottom wall 47a side of the U-shape segment 47. Therefore, when the airbag 10 develops and expands, even if tensile stress acts on the supporting rods 51 of the metallic plate in a direction toward which the clip 29 comes off from the fixing slot 2a, i.e. in the in-vehicle side direction along the axial direction of the shaft 38 of the clip 29, in such a manner as to buckle or bend the supporting rods 51, the supporting pieces 41 of the core member 39 can cope with the tensile stress in a reinforcing manner. Namely, Although the securing lugs 49 inclusive of the supporting rods 51 are formed of thin metallic plate that can be easily bent, the pair of securing legs 53 will not come off from the fixing slot 2a, so that the attaching portions 20 of the air bag 10 are kept attached to the inner panel 2 as part of the vehicle body 1 firmly.

Further, when viewed from the core member 39 made from synthetic resin, the supporting pieces 41 are covered with the securing steps 50 of the metallic plate. For this reason, scraping of the supporting pieces 41 by the out-vehicle side peripheral edge 2c of the fixing slot 2a is prevented. Moreover, strength reduction of resin due to heat deterioration is prevented. As a result, the core member 39 of synthetic resin stably supports the securing lugs 49.

Thus, by using the clips 29, the respective attaching portions 20 of the air bag 10 are firmly attached and fixed to the inner panel 2 with assured attaching stability for a long time.

Figure 19A:
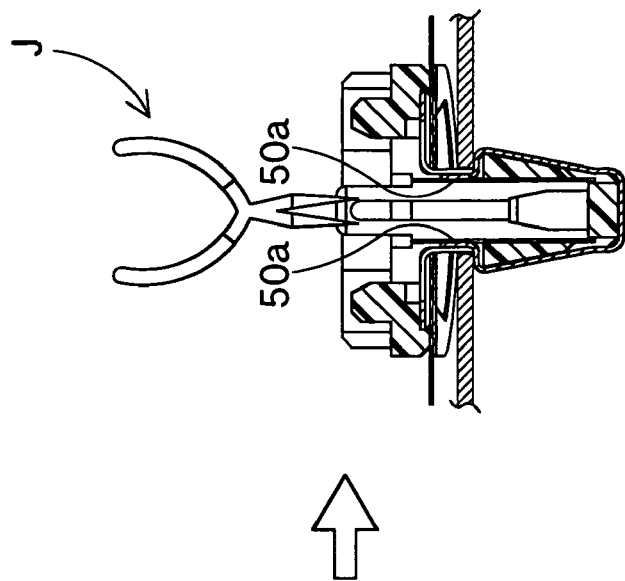
FIGS. 19A, 19B and 19C illustrate, in order, removal of the clip of the present invention from the vehicle body.
Figure 19B:
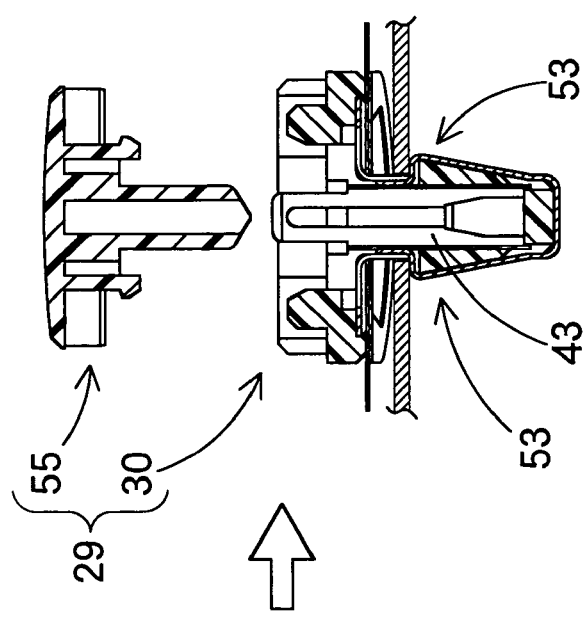
Figure 19C:
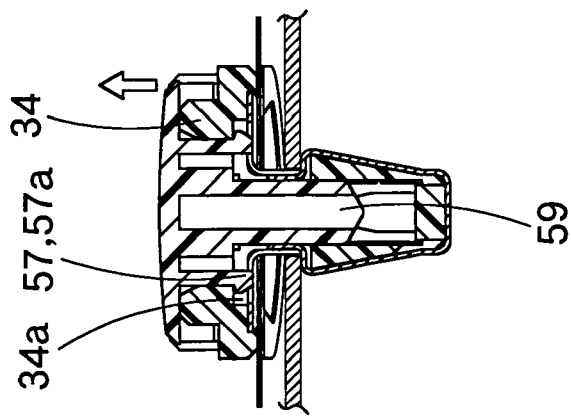

Additionally, after having been attached to the inner panel 2 on the vehicle body 1 side, the attaching portion 20 of the air bag 10 is removed from the vehicle body 1 side as follows: first, as seen from FIGS. 19A and 19B, the locking part 55 is grasped and pulled toward the in-vehicle side so that the engagement of the engagement pieces 57 with the engagement corresponding pieces 34 of the clip body 30 is released. Thus, the spacer 59 is pulled out from the inserting space 43 between the securing legs 53. Thereafter, as seen from FIG. 19C and FIGS. 20A and 20B, the grasping pieces 50a of the securing lugs 49 are grasped using a jig J such as a nipper. By then bringing the securing legs 53, 53 close to each other and pulling the clip body 30 out of the fixing slot 2a, the attaching portion 20 of the air bag 10 is removed from the inner panel 2.

In the foregoing embodiment, when each attaching portion 20 of the air bag 10 is attached and fixed to the inner panel 2, at a point that the pair of securing legs 53 of the clip 29 are inserted into the fixing slot 2a, the horizontal bars 35b of the provisional holding pieces 35 are engaged with the provisional holding corresponding area 60 of the locking part 55, i.e., the spacer 59 is not inserted until a complete insert position in the inserting space 43. Thereafter, in this state, the pair of securing legs 53 are inserted into the fixing slot 2a of the inner panel 2. At this time, as seen from FIGS. 15B and 15C, the securing legs 53 composed of the securing lugs 49 and supporting pieces 41 only warp. For this reason, according to this embodiment, the pair of securing legs 53 are easily inserted into the fixing slot 2a and secured to the out-vehicle side peripheral edge 2c of the fixing slot 2a. Namely, the clip 29 (securing legs 53) attaches the attaching portion 20 of the air bag 10 to the vehicle body 1 while restricting an increase in the insertion load for the fixing slot 2a.

Therefore, in the head protecting air bag device M according to this embodiment, the attaching portions 20 of the air bag 10 are easily attached to the vehicle body 1 with assured attaching stability, and after having attached, the attaching portion 20 can be easily removed therefrom.

Further, in this embodiment, used is the plate-like hold-down plate 62 with the assembling slot 63a having an opening shape similar to that of the fixing slot 2a. And the securing legs 53 are penetrated through the assembling slot 63a so that the hold-down plate 62 is retained by the securing legs 53. Further, the out-vehicle side peripheral edge 20c of the attaching slot 20a of the air bag 10 is arranged between the hold-down plate segment 63 and the head 31 so that the hold-down plate 62 is attached to the clip 29. In this attachment, the clip 29 will be assembled with the attaching portion 20 of the air bag 10 before the air bag 10 is attached to the inner panel 2 of the vehicle body 1 side. Namely, before the air bag 10 is attached to the vehicle body 1 side, the hold-down plate 62 permits the air bag 10 and the clip 29 to be integrated so that missing of the clip 29 etc. can be prevented. As a result, the hold-down plate 62 facilitates handling of the air bag device M.

Further, in this embodiment, the hold-down plate 62 is made of spring steel, and includes the hold-down plate segment 63 with the assembling slot 63a and the deformed plate segment 65 displaced from the hold-down plate segment 63 toward the out-vehicle side, the segments 63 and 65 are coupled by the coupling pieces 64. For this reason, when the clip 29 is attached to the inner panel 2 on the vehicle body 1 side, as seen from FIG. 16, the deformed plate segment 65 of the hold-down plate 62 is pressed toward the in-vehicle side peripheral edge 2b of the fixing slot 2a, thereby absorbing an error in the thickness of the inner panel 2. When the same clips are attached to the respective attaching portions 20 of the air bag 10, even if each attaching portion 20 is attached and fixed to each of parts with different thicknesses of the inner panel 2, the deformed plate segment 65 so warps that a clearance between the segment 65 and the hold-down plate segment 63 is adjusted, so that the pair of securing legs 53 of the clip 29 are stably held at the out-vehicle side peripheral edge 2c of the fixing slot 2a.

Further, as regards the clip 29 according to this embodiment, before the spacer 59 is inserted in the inserting space 43 in order to prevent the pair of securing legs 53 from approaching each other, the provisional holding corresponding areas 60 are engaged with the horizontal bars 35b of the provisional holding pieces 35 so that the locking part 55 is provisionally held by the clip body 30. This provisional holding state is a state where the spacer 59 is located at a position permitting the warp of the pair of securing legs 53 in a mutual approaching direction when they are inserted into the fixing slot 2a. In this state, the locking part 55 is provisionally held by the clip body 30. For this reason, even before the spacer 59 is inserted in the inserting space 43, the locking part 55 will not come off from the clip body 30, thereby facilitating handling of the clip 29.

Figure 21:
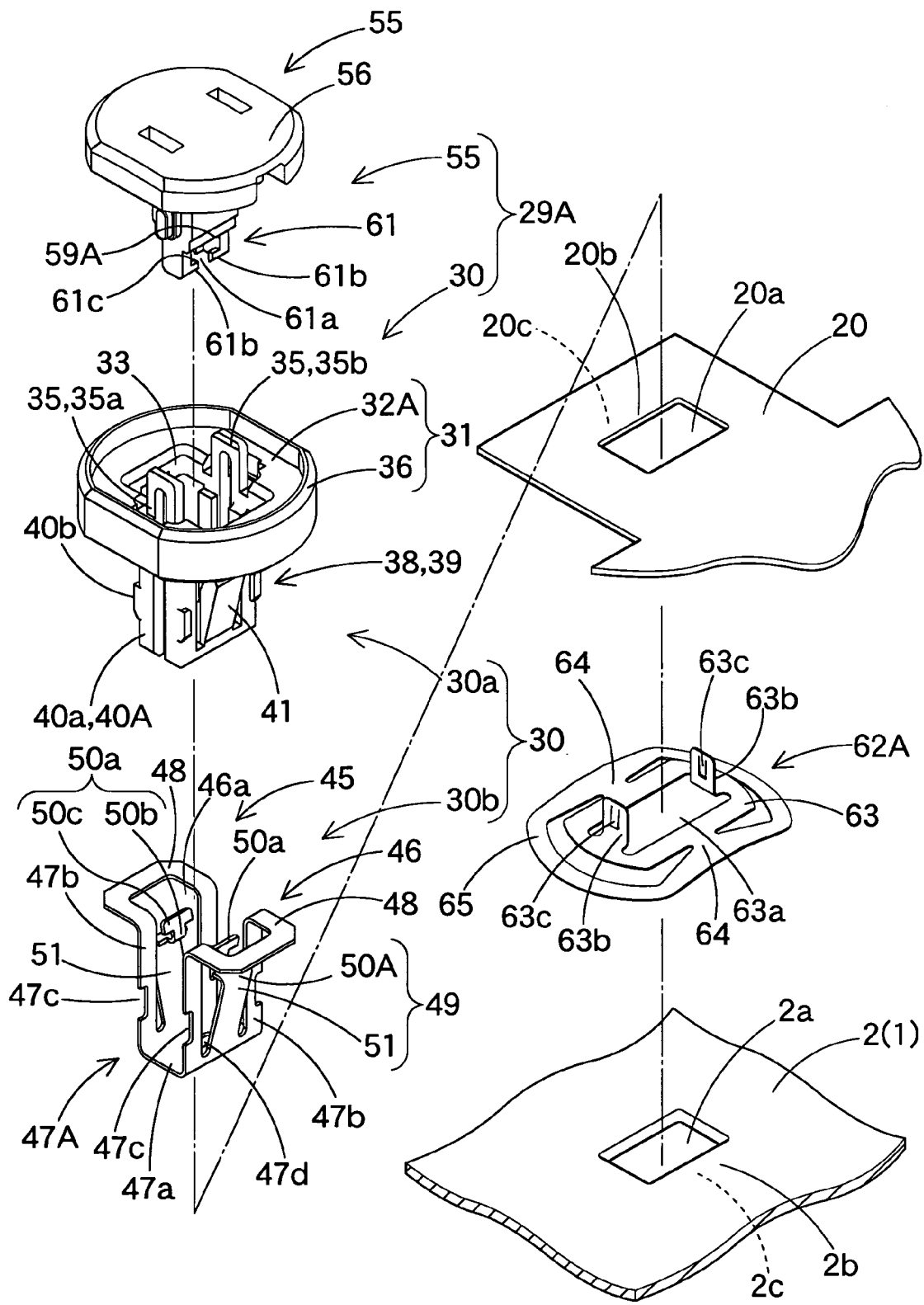
FIG. 21 is an exploded perspective view of the vicinity of a clip in a modification of the embodiment of the present invention.
Figure 22:
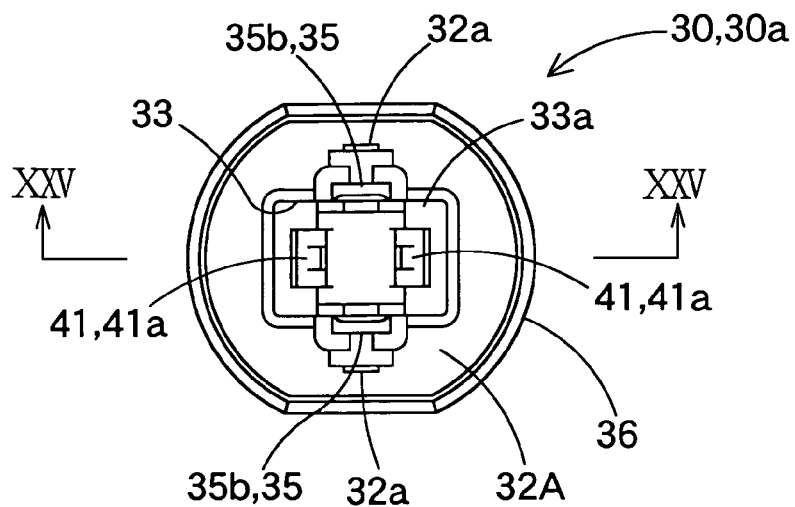
FIG. 22 is a plan view of a clip body (resin portion) without a shell member in the clip in the modification shown in FIG. 21.
Figure 33A:
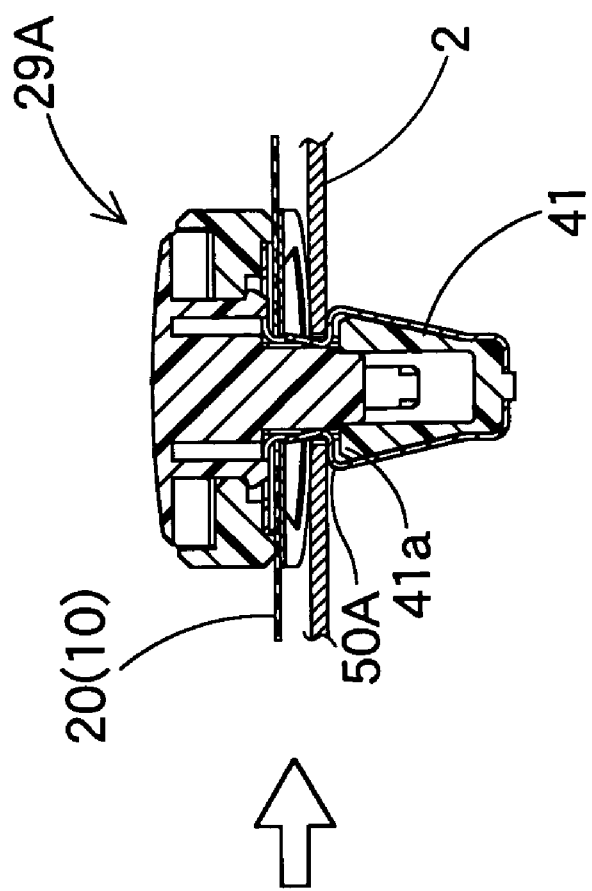
FIGS. 33A and 33B illustrate, in order, attaching processes of the attaching portion of the air bag to the vehicle body by the clip of FIG. 21.
Figure 33B:
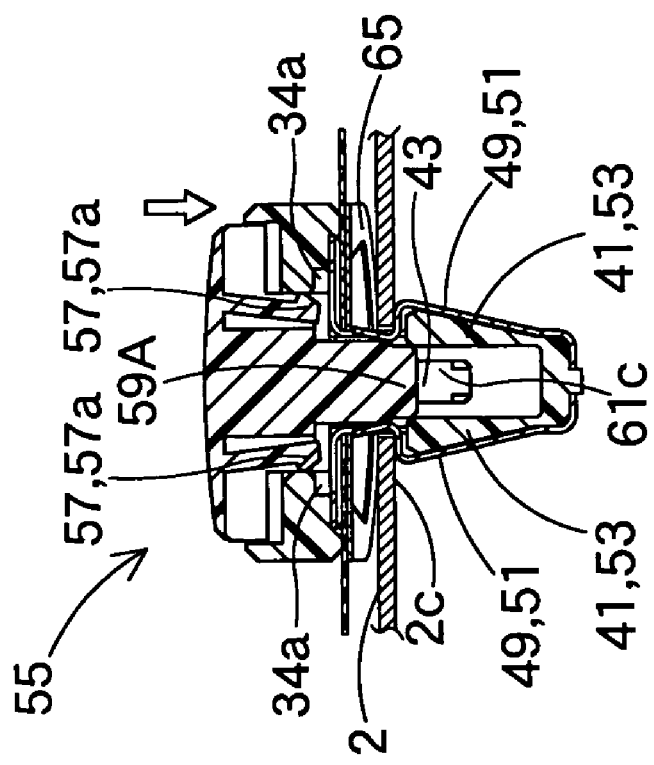
Figure 34:
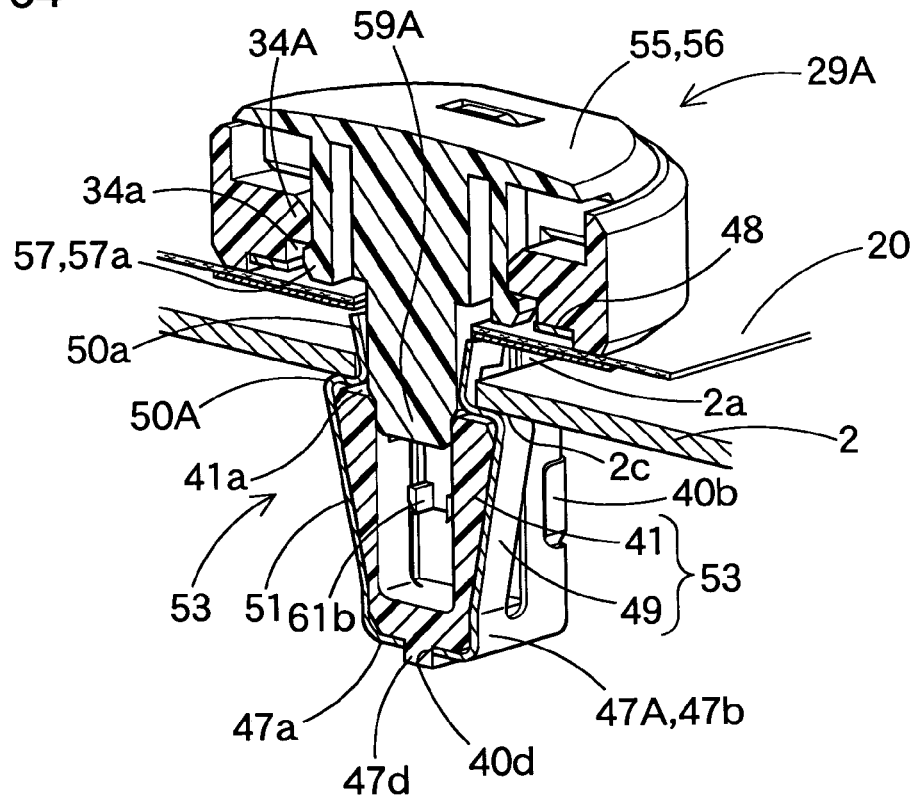
FIG. 34 is a partial sectional perspective view showing the state where the clip in the modification shown in FIG. 21 has been attached to the vehicle body.
Figure 35:
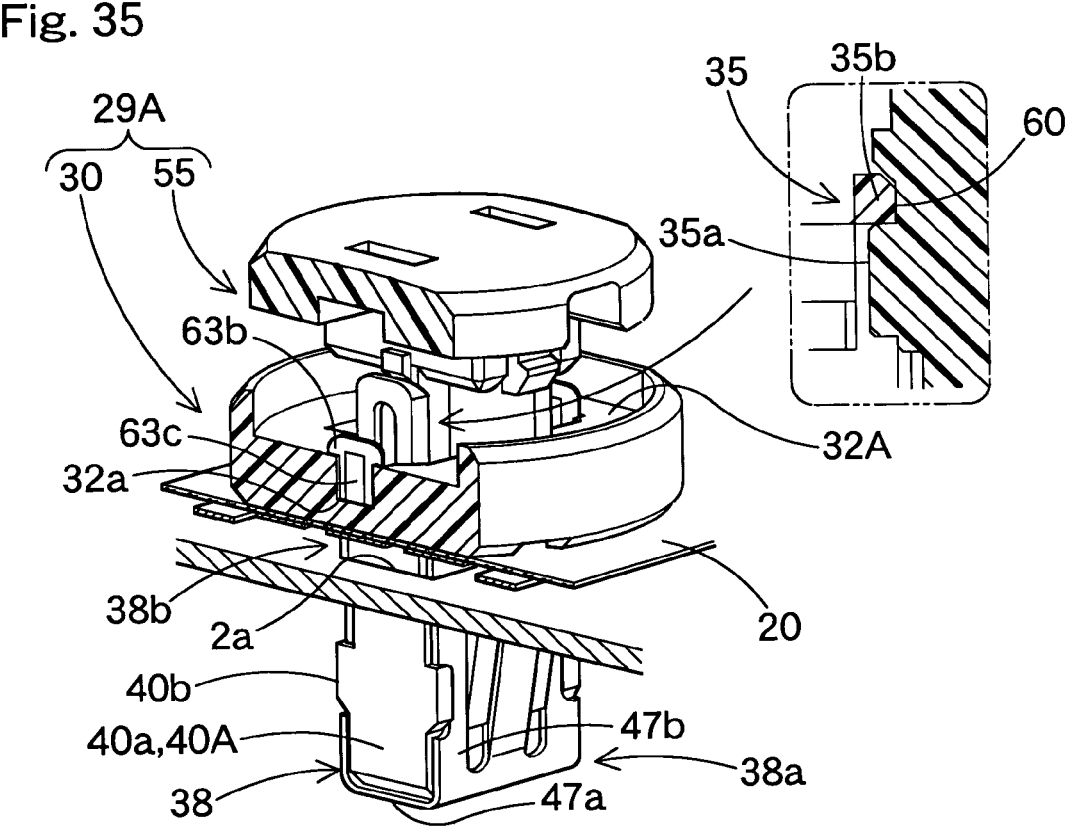
FIG. 35 is a partial sectional perspective view showing a state where a locking part has been provisionally held to the clip body in the clip shown in FIG. 21.
Figure 36:
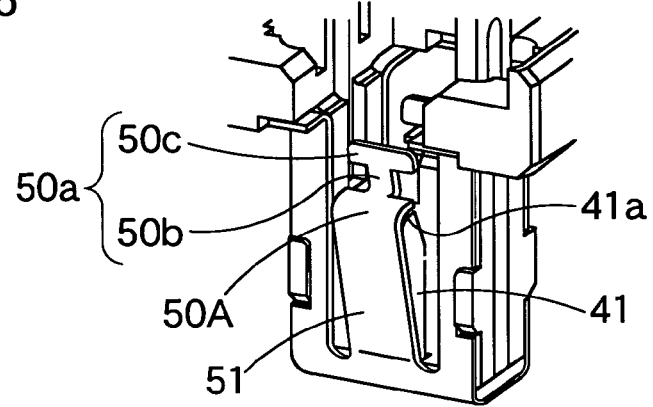
FIG. 36 is a partial sectional perspective view showing a state where a shell member of the clip in the modification shown in FIG. 21 is assembled with a core member.

Incidentally, the clip may be constructed like a clip 29A shown in FIGS. 21, 34 and 35. This clip 29A, as seen from FIGS. 32C and 33, is constructed such that the clip 29A can be inserted in the fixing slot 2a in a condition that the securing legs 53 approach each other, and that, when the spacer 59A of the locking part 55 is inserted into the inserting space 43, the securing legs 53 are opened to limit their mutual approaching.

As seen from FIG. 21, FIGS. 29 to 31, FIGS. 32A, 32B and FIGS. 36, 37, a first significant difference between the clip 29A and the clip 29 resides in structures of a spacer 59A of the locking part 55 and securing steps 50A of the securing lugs 49 in the shell member 45 of the clip body 30. Specifically, the spacer 59A is provided with a securing part 61 located at its tip. In the securing step 50A of each of the securing lugs 49, the grasping piece 50a is composed of a neck 50b having a small width and a projection 50c projected in a width direction from the neck 50b.

Figure 26:
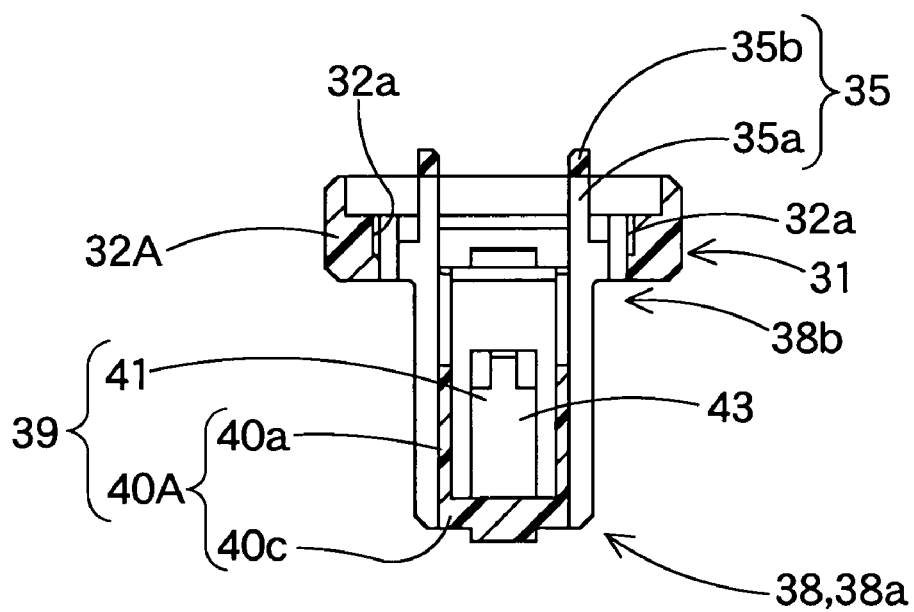
FIG. 26 is a sectional view of the clip body without a shell member in the clip in the modification shown in FIG. 21, which is taken along line XXVI-XXVI in FIG. 23.
Figure 27:
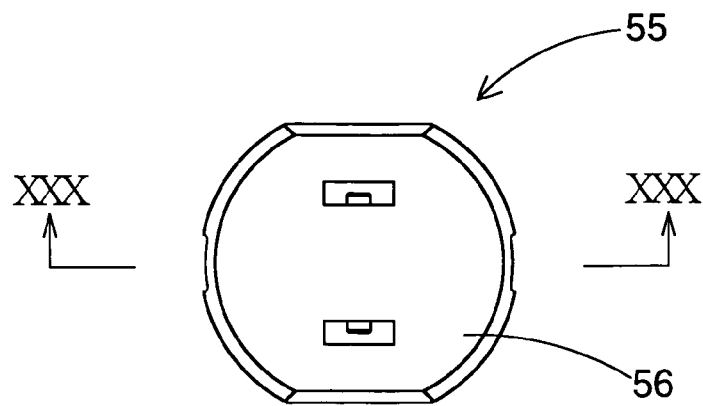
FIG. 27 is a plan view of a locking part of the clip in the modification shown in FIG. 21.
Figure 28:
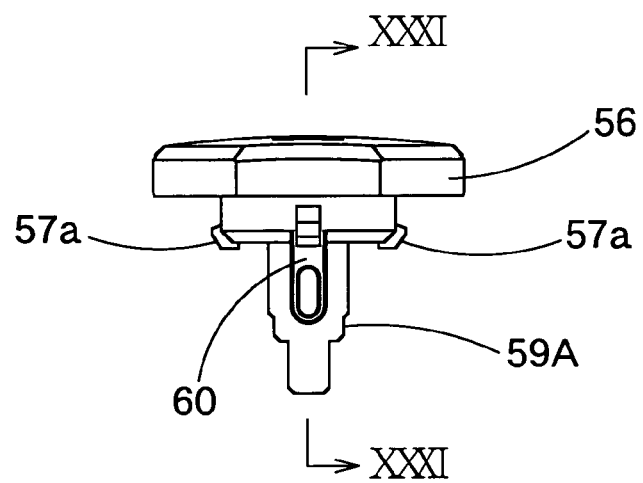
FIG. 28 is a front view of the locking part of the clip in the modification shown in FIG. 21.
Figure 29:
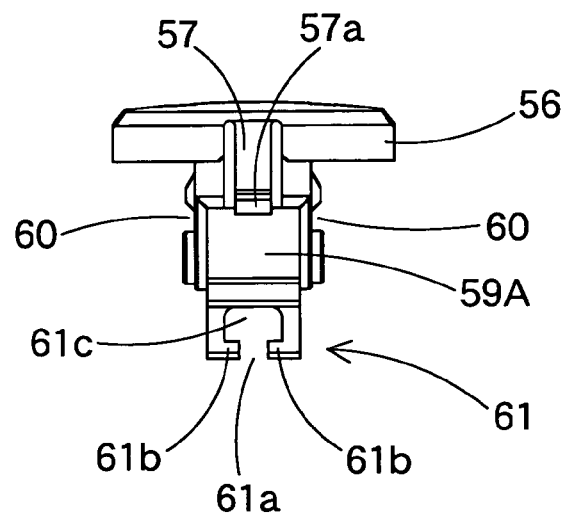
FIG. 29 is a side view of the locking part of the clip in the modification shown in FIG. 21.
Figure 30:
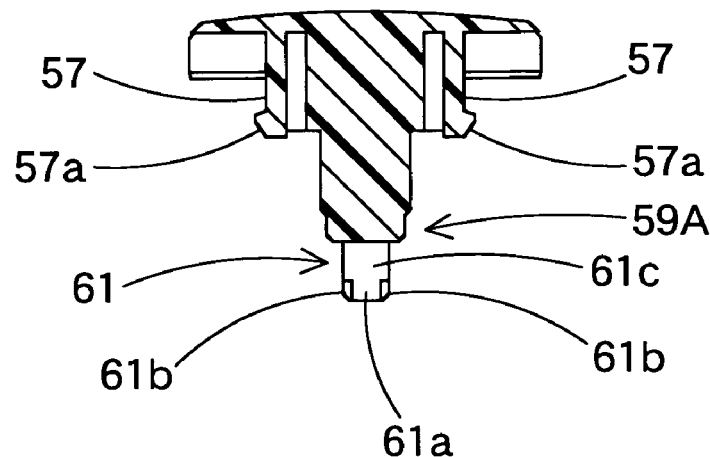
FIG. 30 is a sectional view of the locking part of the clip in the modification shown in FIG. 21, which is taken along XXX-XXX in FIG. 27.
Figure 31:
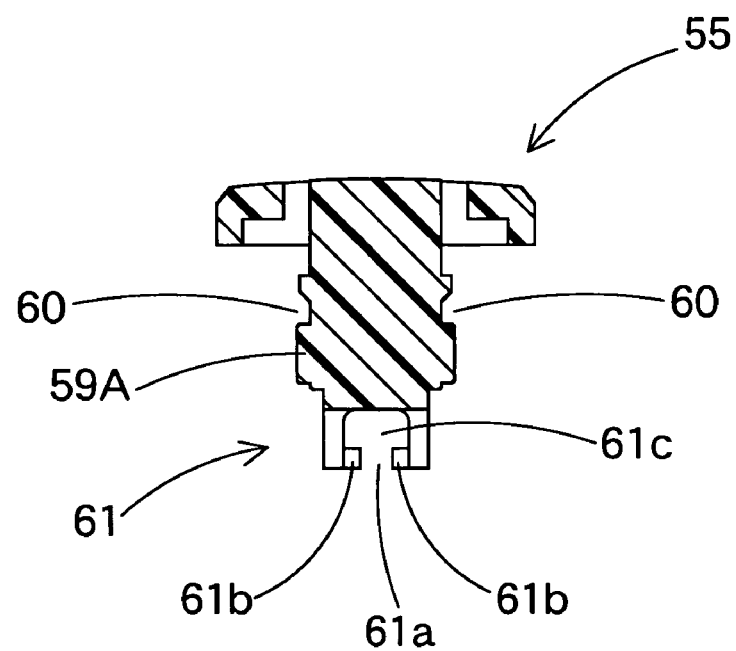
FIG. 31 is a sectional view of the locking part of the clip in the modification shown in FIG. 21, which is taken along XXXI-XXXI in FIG. 28.

Further, a second difference resides in that the clip 29A is provided with hanging pieces 63b, 63b as shown in FIGS. 21 and 35, and hanging steps 32a as shown in FIGS. 26 and 35. The hanging pieces 63b, as seen from FIGS. 21 and 35, protrude from opposite shorter sides of the assembling slot 63a having a rectangular opening, in an edge of the assembling slot 63a of the hold-down plate segment 63 of the hold-down plate 62A, and protrude in a direction leaving the deformed plate segment 65. The hanging piece 63b is equipped with a cut lug 63c whose tip on the side of the deformed plate segment 65 is cut outwards. The hanging steps 32a, as seen from FIGS. 26 and 35, retain the cut lugs 63c of the hanging lugs 63b when the clip body 30 is assembled with the hold-down plate 62A at the bottom wall 32A of the head 31 through the attaching portion 20 of the air bag 10. The hanging steps 32a help secure the hold-down plate 62A to the clip 29A with no tottering. Each of the hanging steps 32a is formed by making a dent groove in the vicinity of the provisional holding pieces 35 which oppose to each other in the inner edge of the inserting slot 33 of the bottom wall 32 of the head 31, on a side leaving the shaft 38.

Figure 23:
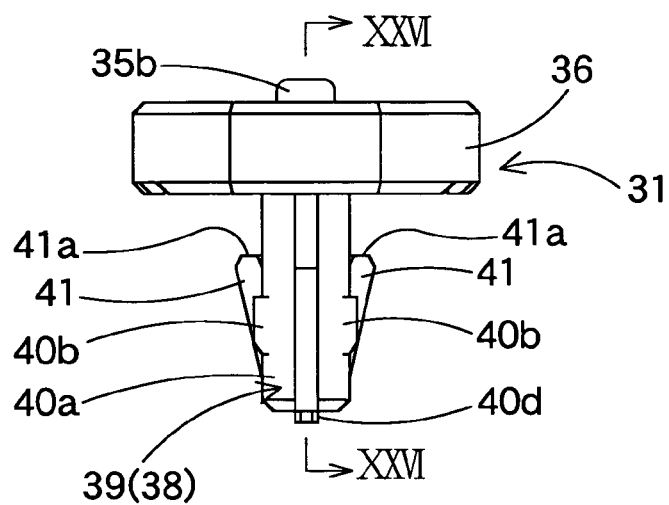
FIG. 23 is a front view of the clip body without a shell member in the clip in the modification shown in FIG. 21.
Figure 24:
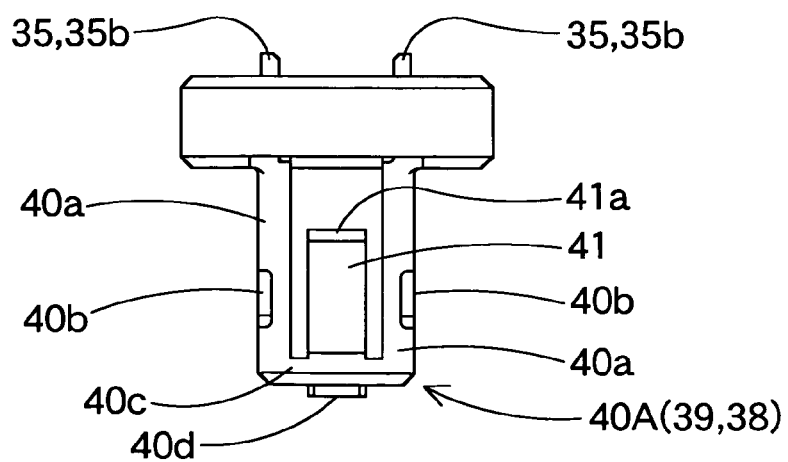
FIG. 24 is a side view of the clip body without a shell member in the clip in the modification shown in FIG. 21.
Figure 25:
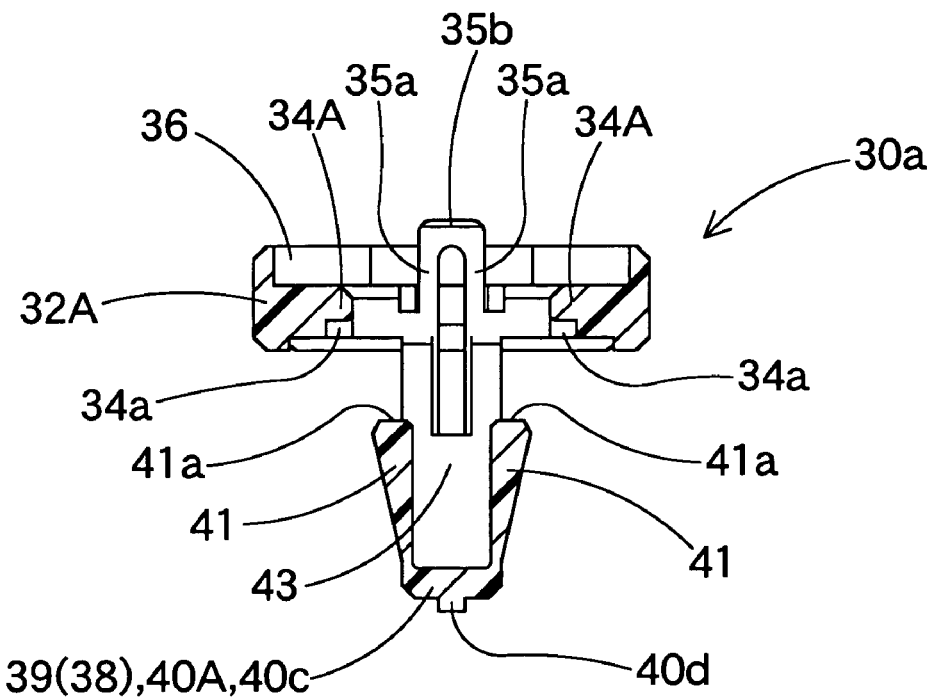
FIG. 25 is a sectional view of the clip body without a shell member in the clip in the modification shown in FIG. 21, which is taken along line XXV-XXV in FIG. 22.

Further, the clip 29A is different from the clip 29 in structures of engagement corresponding pieces 34A (FIGS. 25 and 34), a U-shape segment 47A (FIGS. 21, 23 and 34) and a pillar 40A (FIGS. 21, 23 and 34). Specifically, as shown in FIGS. 21, 23 and 34, in the clip 29A, engagement corresponding pieces 34A with engagement groove 43a, by which the engagement pieces 57 of the locking part 55 are retained when the spacer 59A is inserted into the inserting space 43, are not protruded from the bottom wall 32A. Further, as seen from FIGS. 21, 23 and 34, in order that the shell member 45 and the core member 39 are engaged with each other when the former is combined with the latter, the U-shape segment 47A is equipped with an assembling slot 47d at the center of the bottom wall 47a, and the pillar 40A is equipped, in a bottom wall 40c, with an assembling projection 40d to be fitted in the assembling slot 47d.

The securing part 61 of the spacer 59A, which differentiates the clip 29A from the clip 29, as seen from FIGS. 21 and 29 to 31, includes an inserting mouth 61a, securing pieces 61b and an opening mouth 61c at a tip side of the spacer 59A. The inserting mouth 61a is opened toward the tip face of the spacer 59A to extend from the tip of the spacer 59A toward the top 56. The opening mouth 61c penetrates in a direction orthogonal to the axis of the spacer 59A, and its opening shape corresponds to outer shapes of the neck 50d and projection 50c of the grasping piece 50a. A penetrating direction of the opening mouth 61c is the opposite direction of longer sides of a rectangular cross section of the spacer 59A, i.e. a warping direction of the pair of securing legs 53. The securing pieces 61b are arranged at four positions of the tip of the spacer 59A, and formed into a remaining shape as a result of forming the inserting mouth 61a and opening mouth 61c. Each of the securing pieces 61b is a rod-like body protruding toward center from both edges of longer sides of a rectangular cross section of the spacer 59A in such a manner as to approach each other. The securing pieces 61b are located at such positions that the securing pieces 61 interfere with (hit against) the grasping pieces 50a of the pair of securing lugs 49, where the locking part 55 is provisionally held by the clip body 30 by having the horizontal bars 35b of the provisional holding pieces 35 engaged with the dent grooves of the provisional holding corresponding areas 60, if the pair of securing lugs 49 are simultaneously brought close to each other.

Except for the differences described above, configurations of the clip 29A and hold-down plate 62A are the same as those of the clip 29 and hold-down plate 62. Like members and positions are given with like reference symbols and will not be explained.

To secure the attaching portions 20 of the air bag 10 to the inner panel 2 serving as fixing part of the vehicle body 1 side using the clips 29A, firstly, the side walls 47b of the U-shape segment 47A of the shell member 45, while being opened, are put on the supporting pieces 41 of the core member 39. Next, with the flanges 48 being contact with the bottom wall 32A of the head 31, the side walls 47b are narrowed from the opened state so that the assembling projections 40b and 40d are fitted in the assembling dents 47c and the assembling slot 47d, respectively. Thus, the shell member 45 is assembled with the core member 39, thereby forming the clip body 30. Then as seen from FIGS. 32A and 32B, the securing legs 53 of the clip body 30 are warped to approach each other and held in this state so that the grasping pieces 50a of the securing steps 50A of the pair of securing lugs 49 are kept close to each other. In this state, while the spacer 59A of the locking part 55 is inserted into the inserting slot 33 from its tip, the grasping pieces 50a are inserted into the inserting mouth 61a of the securing part 61 so that the horizontal bars 35b of the provisional holding pieces 35 are engaged with the provisional holding corresponding areas 60. Subsequently, the hold-down of the securing legs 53 is released. Then, the securing legs 53 try to be so separated from each other as to restore their original state. However, the projections 50c of the grasping pieces 50a butt against inner surfaces of the securing pieces 61b of the securing part 61 at the tip of the spacer 59A of the locking part 55. Therefore, as seen from FIG. 32B, the securing legs 53 maintain their mutually approached state, where the securing legs 53 are housed within the core member 39, and the legs 53 are brought into almost no contact with an inner periphery of the fixing slot 2a when the shaft 38 is inserted into the fixing slot 2a.

Figure 32A:
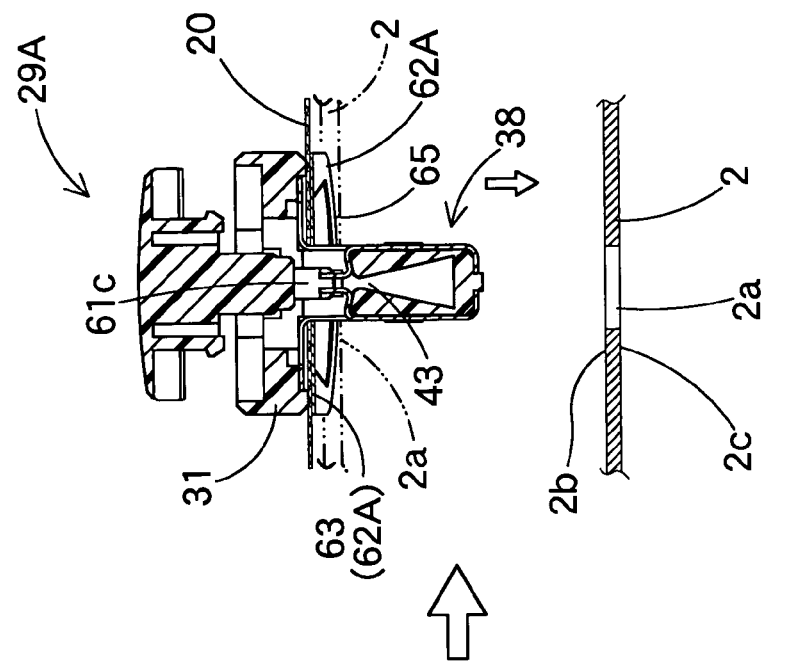
FIGS. 32A, 32B and 32C illustrate, in order, attaching processes of the clip in the modification shown in FIG. 21 to an attaching portion of the air bag, and to the vehicle body.
Figure 32B:
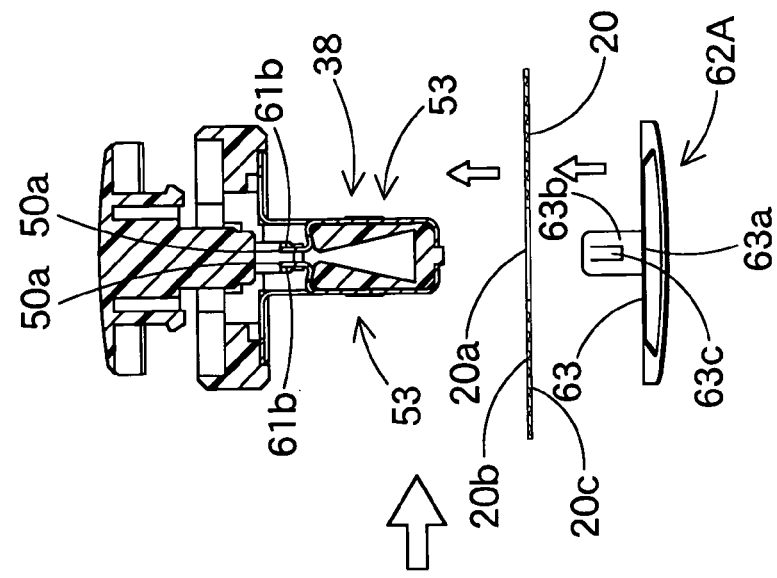
Figure 32C:
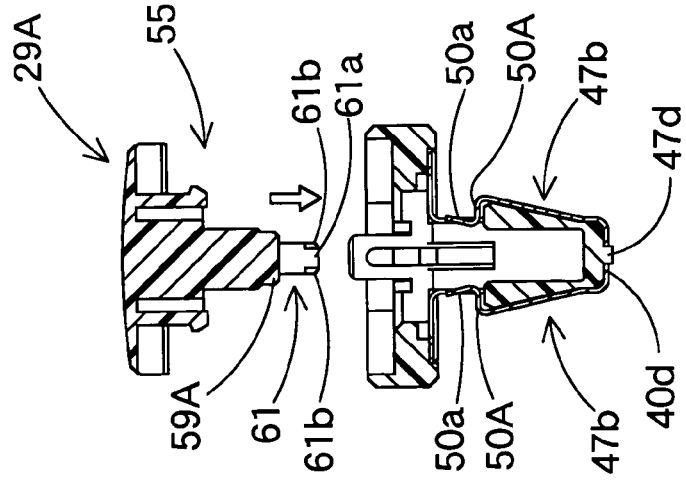

Thereafter, as seen from FIGS. 32B and 32C, the shaft 38 is inserted into the assembling slot 63a of the hold-down plate 62A via the attaching slot 20a of the attaching portion 20 of the air bag 10 so that the cut lug 63c of each hanging piece 63b of the hold-down plate 62A is retained at the hanging step 32a of the clip body 30 of the clip 29A. Then, the attaching portion 20 is sandwiched between the head 31 of the clip 29A and the hold-down plate segment 63 of the hold-down plate 62A, so that the clip 29A and the hold-down plate 62A are attached to each attaching portion 20 of the air bag 10.

Figure 37:
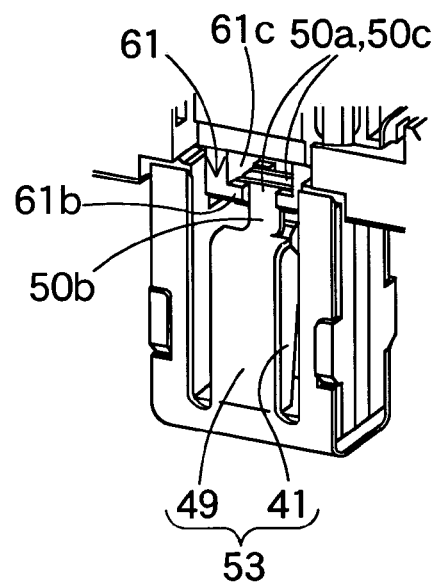
FIG. 37 is a partial sectional perspective view showing the state where the locking part has been provisionally held to the body of the clip in the modification shown in FIG. 21.
Figure 38:
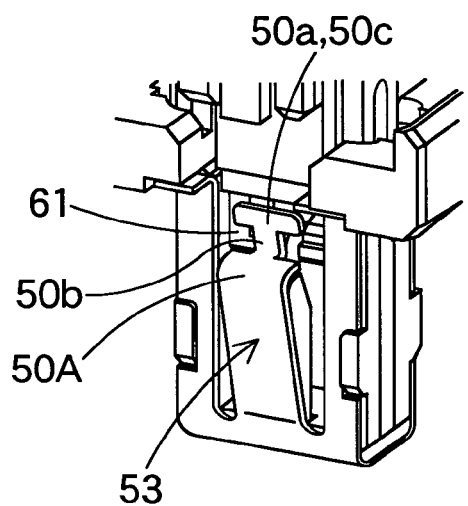
FIG. 38 is a partial sectional view showing the state where the clip in the modification in the modification shown in FIG. 21 has been attached to the vehicle body.

Each of the attaching portions 20 of the air bag 10 will be attached and fixed to the inner panel 2 as part of the vehicle body 1 as follows: as seen from FIG. 32C, the shaft 38 of the clip 29A is inserted into the fixing slot 2a so that the deformed plate segment 65 of the hold-down plate 62A is brought into contact with the in-vehicle side peripheral edge 2b of the fixing slot 2a. Next, as seen from FIGS. 33A and 33B, the locking part 55 is pushed in so that the spacer 59A reaches a complete insert position in the inserting space 43. At this time, the securing pieces 61b of the securing part 61 in the spacer 59A are displaced so that the grasping pieces 50a of the pair of the securing lugs 49 are located at the opening mouth 61c of the securing part 61. Thus, the grasping pieces 50a are released from their engagement with the securing pieces 61b and jump out from the opening mouth 61c. As a result, the pair of securing legs 53 restore from warped state and hold the out-vehicle side peripheral edge 2c of the fixing slot 2a, and the spacer 59A is arranged between the securing legs 53 to prevent them from approaching each other (FIGS. 34, 37 and 38). When the pair of securing legs 53 hold the out-vehicle side peripheral edge 2c of the fixing slot 2a, the hook-like pieces 57a of the engagement pieces 57 are engaged with the engaging grooves 34a of the engagement corresponding pieces 34A, so that the locking part 55 is anchored to the clip body 30. As a result, the attaching portion 20 of the air bag 10 is firmly attached and fixed to the inner panel 2.

Figure 40A:
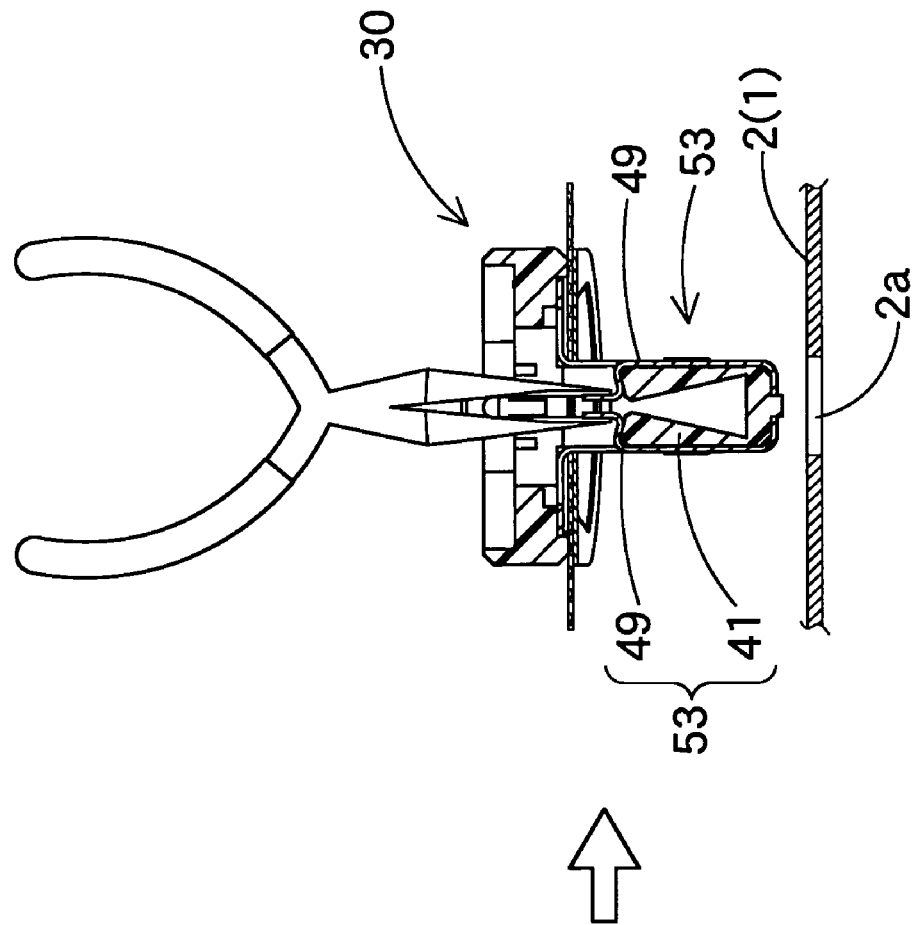
FIGS. 40A and 40B illustrate, in order, the removal of the clip in the modification shown in FIG. 21, which follow FIG. 39B.
Figure 40B:
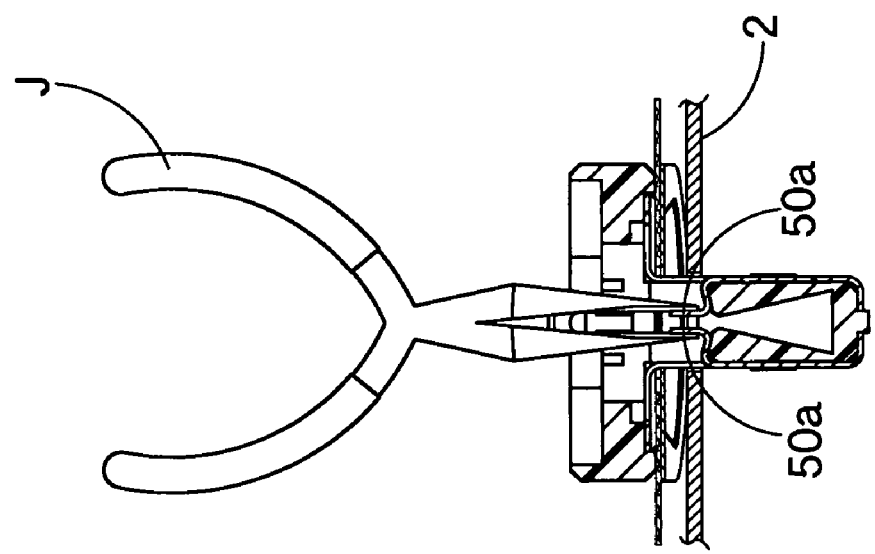

After having been attached to the inner panel 2, in order to remove the attaching portion 20 of the air bag 10, as seen from FIGS. 39A and 39B, the locking part 55 is grasped and pulled toward the in-vehicle side so that the engagement of the engagement pieces 57 with the engagement corresponding pieces 34A of the clip body 30 is released, and the spacer 59A is pulled out from the inserting space 43 between the securing legs 53. Thereafter, as seen from FIGS. 40A and 40B, using a jig J such as a nipper, the grasping pieces 50a of the securing lugs 49 are grasped so that the pair of securing legs 53 approach each other, and the clip body 30 is pulled out from the fixing slot 2a. Thus, the attaching portion 20 of the air bag 10 can be easily removed from the inner panel 2.

The air bag device M provided with the clips 29A and hold-down plates 62A provide the same working effects as the air bag device M provided with the clips 29 and hold-down plates 62. Further, while the locking part 55 of the clip 29A is provisionally held by the clip body 30 using the provisional holding pieces 35, the securing pieces 61b of the securing part 61 hold the pair of securing legs 53 (securing lugs 49) in an approached state. In this state, the securing legs 53 can pass through the fixing slot 2a with possible least contact with an inner periphery of the fixing slot 2a. The securing part 61 is arranged in the spacer 59A so that, when the spacer 59A is thereafter inserted into the inserting space 43, the opening mouth 61c is located aside the grasping pieces 50a to release the securing legs 53 from mutually approached state.

Accordingly, in the structure described above, the load of inserting the clip 29A into the fixing slot 2a can be greatly reduced, thereby further facilitating the mounting of the air bag 10 on the vehicle V.

In the clips 29 and 29A in the embodiments described above, the engagement pieces 57 which engage the locking part 55 with the clip body 30 are formed to have the hook-like pieces 57a to be engaged in the engaging grooves 34a. However, it will also be appreciated that the engagement pieces 57 may be provided with dent grooves whereas the corresponding portions on a part of the clip body 30 are provided with protrusive hook-like pieces engageable with the dent grooves. In the embodiments described above, the provisional holding pieces 35 which provisionally hold the locking part 55 by the clip body 30 are formed as convex horizontal bars 35 engageable with the concave provisional holding corresponding areas 60. However, it will also be appreciated that the provisional holding pieces 35 are provided with concave portions whereas the locking part 55 is provided with convex corresponding portions that disengageablly engaged in the concave portions.

What is claimed is:
1. A head protecting air bag device mounted on vehicle, the device including an air bag and a plurality of clips, wherein:
the air bag is housed on an upper side of a side window in a folded state, and when expansion gas flows in, the airbag developing and expanding to cover the side window;
the air bag is provided with a plurality of attaching portions to be attached to fixing part on part of vehicle body, each of the attaching portions including an attaching slot;
each of the clips is inserted in a fixing slot formed in the fixing part of the vehicle body and secured thereat, each of the clips including a clip body and a locking part detachably engaged with the clip body;
the clip body includes:
a shaft having a pair of securing legs protruded from tip side to base side of the shaft, the securing legs being inserted into the attaching slot of the airbag, and then into the fixing slot of vehicle body, from in-vehicle side, while warping to approach each other, and then restoring from mutually approaching state, whereby secured to an out-vehicle side periphery of the fixing slot; and
a head coupled with the base side of the shaft, the head attaching the attaching portion of the air bag to the fixing part of vehicle body by holding down and position limiting a periphery of the attaching slot of the air bag onto in-vehicle side periphery of the fixing slot, when the pair of securing legs are secured to the out-vehicle side periphery of the fixing slot;

the locking part includes:

a spacer to be inserted in between the pair of securing legs so as to prevent the pair of securing legs secured at the out-vehicle side periphery of the fixing slot from approaching each other; and an engagement area serving to engage the locking part with the clip body, the engagement area allowing the locking part to be detached from the clip body when an insertion of the spacer in between the pair of securing legs is completed;

the shaft is formed as a double layer structure including:

a shell member of metallic plate extending toward both sides from tip side of the shaft to continuously constitute an outer surface of the pair of securing legs; and a core member of synthetic resin arranged in inner periphery of the shell member;

the shell member includes a pair of securing lugs each of which includes: a securing step engageable in the out-vehicle side periphery of the fixing slot; and a supporting rod extending toward tip side of the shaft from the securing step;

the core member includes a pair of supporting pieces;

the pair of supporting pieces are arranged in such a manner as to extend toward both sides from tip side of the shaft to continuously constitute an inner periphery of the pair of securing legs;

the pair of supporting pieces are arranged in opposite sides of the securing lugs in such a manner as to support rear sides of the securing steps of the shell member; and the pair of supporting pieces has an inserting space therebetween into which the spacer of the locking part is inserted, whereby, when the spacer is inserted into the inserting space, the supporting pieces are brought into contact with the spacer and the securing lugs, and the securing lugs are prevented from moving toward each other.

2. The head protecting air bag device according to claim 1, wherein:

the air bag device further includes a hold-down plate having an assembling slot with an opening shape similar to that of the fixing slot, the hold-down plate having an outer shape larger than that of the attaching slot of air bag attaching portion; and the clip is combined with the attaching portion of the air bag before attachment of the air bag to the fixing part of the vehicle body, in such a manner that the pair of securing legs are penetrated through the attaching slot of the attaching portion of the air bag, and then through the assembling slot of the hold-down plate so as to be secured to a periphery of the assembling slot, and the periphery of the attaching slot and the periphery of the assembling slot are arranged between the securing legs and the head of the clip.

3. The head protecting air bag according to claim 2, wherein:

the hold-down plate is made of spring steel, and includes:

a hold-down plate segment having the assembling slot; and a ring-shaped deformed plate segment arranged around the hold-down plate segment, the hold-down plate segment and the deformed plate segment being coupled with a coupling piece; and the deformed plate segment is arranged at a position displaced toward out-vehicle side from the hold-down plate segment with respect to the coupling piece.

4. The head protecting air bag device according to claim 1, wherein the locking part is provisionally held by the clip body before the spacer is inserted in between the pair of securing legs.

5. The head protecting air bag device according to claim 4, wherein the locking part includes a securing part, the securing part, while the locking part is provisionally held by the clip body, holding the pair of securing legs in a mutually approached state so as to allow the securing legs to pass through the fixing slot; and the securing part releasing the securing legs from the mutually approached state when the spacer is inserted into the inserting space.

6. The head protecting air bag device according to claim 5, wherein:

the airbag device further includes a hold-down plate of spring steel having an assembling slot with an opening similar to that of the fixing slot, the hold-down plate having an outer shape larger than that of the attaching slot of airbag attaching portion;

the hold-down plate includes a hold-down plate segment having the assembling slot, and a ring-shaped deformed plate segment arranged around the hold-down plate segment, the hold-down plate segment and the deformed plate segment being coupled with a coupling piece;

the hold-down plate segment is constructed to be retained by the head of the clip;

the deformed plate segment is arranged at a position displaced toward out-vehicle side from the hold-down plate segment with respect to the coupling piece; and the clip is combined with the attaching portion of said air bag before attachment of the airbag to the fixing part of the vehicle body, in such a manner that the pair of securing legs are penetrated through the attaching slot of the attaching portion of said air bag, and then through the assembling slot of the hold-down plate segment, and the hold-down plate segment is retained by the head of the clip.

\* \* \* \* \*